US011169640B2

(12) United States Patent
Lee

(10) Patent No.: US 11,169,640 B2
(45) Date of Patent: Nov. 9, 2021

(54) ELECTRONIC DEVICE AND OPERATING METHOD THEREFOR

(71) Applicant: COREDAR CO., LTD., Seongnam-si (KR)

(72) Inventor: Tak Geon Lee, Seongnam-si (KR)

(73) Assignee: COREDAR CO., LTD., Seongnam-si (KR)

( * ) Notice: Subject to any disclaimer, the term of this patent is extended or adjusted under 35 U.S.C. 154(b) by 0 days.

(21) Appl. No.: 16/194,846

(22) Filed: Nov. 19, 2018

(65) Prior Publication Data

US 2019/0102043 A1 Apr. 4, 2019

Related U.S. Application Data

(63) Continuation of application No. PCT/KR2017/004844, filed on May 10, 2017.

(30) Foreign Application Priority Data

May 20, 2016 (KR) .................... 10-2016-0062180

(51) Int. Cl.
  *G06F 3/042* (2006.01)
  *G06F 3/01* (2006.01)
  *G06F 3/03* (2006.01)
  *G06F 3/0488* (2013.01)

(52) U.S. Cl.
  CPC .............. *G06F 3/0421* (2013.01); *G06F 3/01* (2013.01); *G06F 3/03* (2013.01); *G06F 3/04883* (2013.01)

(58) Field of Classification Search
  USPC ........................................................ 345/175
  See application file for complete search history.

(56) References Cited

U.S. PATENT DOCUMENTS

| 8,018,579 | B1* | 9/2011 | Krah | ...................... G06F 3/005 |
| | | | | 356/4.01 |
| 8,896,531 | B2 | 11/2014 | Minnen | |
| 9,880,629 | B2 | 1/2018 | Moscarillo | |
| 9,942,529 | B2 | 4/2018 | Yamamoto et al. | |

(Continued)

FOREIGN PATENT DOCUMENTS

| DE | 10 2014 207902 A1 | 10/2015 |
| EP | 2960758 A1 | 12/2015 |

(Continued)

OTHER PUBLICATIONS

International Search Report of corresponding Patent Application No. PCT/KR2017/004844—4 pages (dated Aug. 16, 2017).

(Continued)

*Primary Examiner* — Mark Edwards
*Assistant Examiner* — Jonathan G Cooper
(74) *Attorney, Agent, or Firm* — Sughrue Mion, PLLC

(57) ABSTRACT

Provided are an electronic device and an operation method thereof according to embodiments. The electronic device according to an embodiment includes an optical module configured to radiate light to an object and to detect a distance to the object from the electronic device by using light reflected from the object. The electronic device further includes a processor configured to determine touch information and/or gesture information of the object based on information about the detected distance to the object.

18 Claims, 32 Drawing Sheets

(56) References Cited

U.S. PATENT DOCUMENTS

| | | | | |
|---|---|---|---|---|
| 2009/0262098 | A1* | 10/2009 | Yamada | G06F 1/1616 345/175 |
| 2009/0289911 | A1* | 11/2009 | Nagai | G06F 3/041 345/173 |
| 2009/0298691 | A1* | 12/2009 | Koschnick | A01N 43/90 504/121 |
| 2013/0083496 | A1* | 4/2013 | Franklin | H01M 10/0436 361/749 |
| 2013/0100075 | A1* | 4/2013 | Viswanathan | G06F 3/0425 345/175 |
| 2013/0142383 | A1 | 6/2013 | Viswanathan et al. | |
| 2013/0257582 | A1* | 10/2013 | Rothkopf | G06F 1/1656 340/3.1 |
| 2014/0160073 | A1* | 6/2014 | Matsuki | G06F 3/04886 345/174 |
| 2014/0267046 | A1* | 9/2014 | Ellsworth | G06F 3/04886 345/168 |
| 2014/0315091 | A1* | 10/2014 | Yamazaki | H01M 4/0426 429/231.8 |
| 2014/0353467 | A1 | 12/2014 | Spears | |
| 2016/0105653 | A1* | 4/2016 | Yamamoto | G09G 5/00 348/744 |
| 2016/0124603 | A1* | 5/2016 | Park | H04M 1/72454 345/173 |
| 2016/0202761 | A1* | 7/2016 | Bostick | G06F 3/0488 345/174 |
| 2016/0342207 | A1* | 11/2016 | Beran | G06F 3/0304 |
| 2019/0012008 | A1* | 1/2019 | Yoon | H04M 1/725 |
| 2019/0250768 | A1* | 8/2019 | Viswanathan | G06F 3/0416 |

FOREIGN PATENT DOCUMENTS

| | | |
|---|---|---|
| JP | 2009-258569 A | 11/2009 |
| JP | 2012-032464 A | 2/2012 |
| JP | 2015-519624 A | 7/2015 |
| KR | 10-2008-0037312 A | 4/2008 |
| KR | 10-2011-0089021 A | 8/2011 |
| KR | 10-2013-0072606 A | 7/2013 |
| KR | 10-2014-0068855 A | 6/2014 |
| WO | 2015/045125 A1 | 4/2015 |

OTHER PUBLICATIONS

Extended European Search Report dated Jan. 13, 2020 in related European Application No. 17799593.3, in 9 pages.

Office Action of corresponding Korean Patent Application No. 10-2016-0062180—3 pages (dated Feb. 13, 2019).

Office Action dated Aug. 11, 2020 in Japanese Application No. 2019-513722.

* cited by examiner

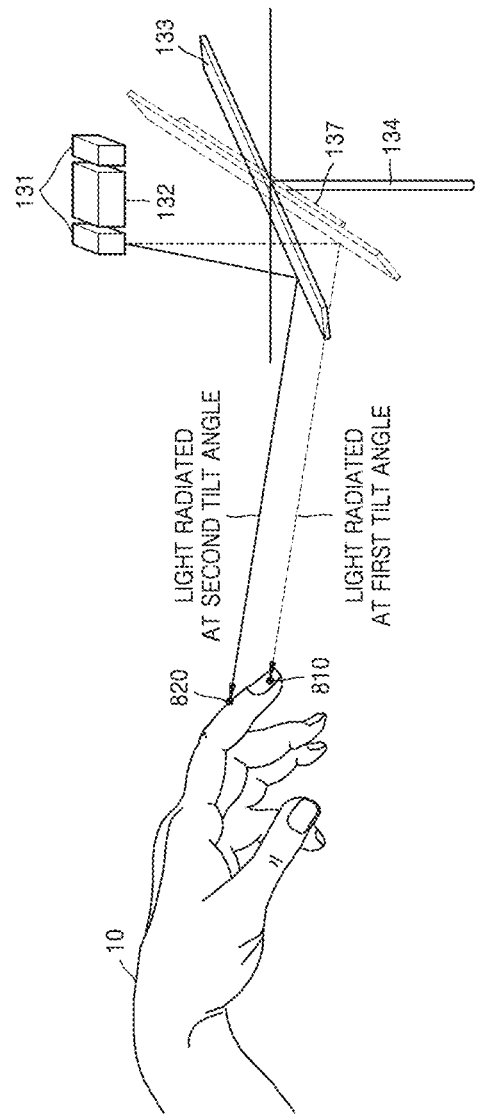

ELECTRONIC DEVICE AND OPERATING METHOD THEREFOR

CROSS-REFERENCE TO RELATED APPLICATIONS

This application is a continuation application, and claims the benefit under 35 U.S.C. §§ 120 and 365 of PCT Application No. PCT/KR2017/004844, filed on May 10, 2017, which is hereby incorporated by reference. PCT/KR2017/004844 claimed priority from Korean Patent Application No. 10-2016-0062180 filed on May 20, 2016 which is hereby incorporated by reference.

BACKGROUND

An embodiment relates to an electronic device and a method, and to an electronic device which recognizes a user's gesture or touch and an operation method of the electronic device.

Recently, due to the development of various sensors and processors, users have been able to utilize not only text input and keypad input, but also data input to an electronic device through various interfaces. For example, a smartphone or electronic device may recognize a gesture through an installed camera, etc., or receive a touch input through a touch sensitive display, etc.

SUMMARY

Gesture recognition or touch input on a display of an electronic device requires an operation on a display of a user-restricted electronic device.

In addition, gesture analysis processing using a camera is accompanied by many processor operations in post-processing and by electric current consumption due to a camera module.

Various embodiments provide an electronic device capable of performing processing corresponding to gesture recognition or touch input in any user-desired space and reducing electric current consumption in such processing, and an operation method of the electronic device.

According to the foregoing embodiments, processing corresponding to gesture recognition or touch input may be performed in any user-desired space, and electric current consumption in such processing may be reduced.

BRIEF DESCRIPTION OF DRAWINGS

FIG. 8D is a diagram for describing an operating principle in an optical module in which a mirror is tiltable, according to an embodiment.

DETAILED DESCRIPTION

Figure 1:
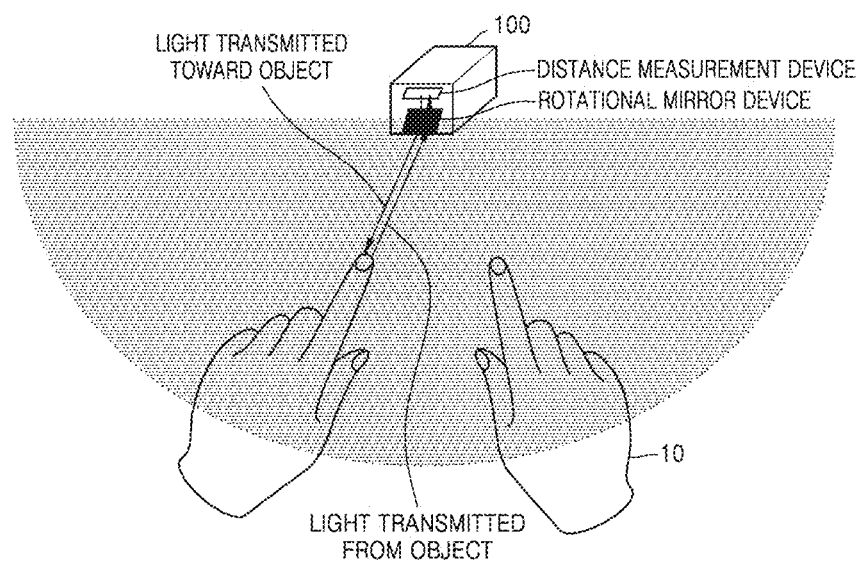
FIG. 1 is a conceptual diagram of an electronic device according to an embodiment.

An electronic device according to an embodiment includes an optical module configured to radiate light to an object and thereby detect a distance to the object from the electronic device by using light reflected from the object and a processor configured to determine touch information and/ or gesture information of the object based on information about the detected distance to the object.

An operation method of an electronic device according to an embodiment includes radiating light to an object, detecting a distance to the object from the electronic device by using light reflected from the object, and determining touch information and/or gesture information of the object based on information about the detected distance to the object.

In a computer-readable storage medium storing programs for executing an operation method of an electronic device according to an embodiment, the operation method includes radiating light to an object, detecting a distance to the object from the electronic device by using light reflected from the object, and determining touch information and/or gesture information of the object based on information about the detected distance to the object.

Hereinafter, with reference to details in the attached drawings, example embodiments according to the present disclosure will be described in detail. In addition, with reference to the details in the attached drawings, a method of configuring and using an electronic device according to an embodiment of the present disclosure will be described in detail. A like reference numeral or symbol provided in each drawing indicates a part or component performing substantially the same function.

Although ordinal numbers such as "first", "second", and so forth will be used to describe various components, those components are not limited by the terms. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related items or any one of the plurality of related items.

The terms used herein are for the purpose of describing embodiments only and are not intended to be limiting and/or restricting. The singular forms are intended to include the plural forms as well, unless the context clearly indicates otherwise. In the present application, the term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

FIG. 1 is a conceptual diagram of an electronic device according to an embodiment.

Referring to FIG. 1, an electronic device 100 according to an embodiment may include a distance measurement device and a rotational mirror device to measure a distance to an object 10 and to perform gesture recognition or touch input processing by using the measured distance.

The electronic device 100 may reflect light coming from a light source by using the rotational mirror device and receive light reflected from the object 10 by using the distance measurement device. The distance measurement device may measure the distance to the object 10 based on the light reflected from the object 10. The electronic device 100 may recognize a user's touch input or gesture based on information about the measured distance to the object 10.

The electronic device 100 according to an embodiment may perform touch input recognition or gesture recognition based on the measured distance to the object 10, and thus may be free from a restriction on a space where a user makes a motion. The electronic device 100 may be positioned in any user-desired space, and the user may locate the electronic device 100 in the user-desired space and make a touch or gesture, such that the electronic device 100 may recognize the user's touch input or gesture.

Since the electronic device 100 uses the distance measurement sensor to recognize a gesture or touch input, instead of using a camera or a large-scale capacitive screen, power consumption may be prevented from increasing even when a user's motion is made in a relatively large space.

Figure 2:
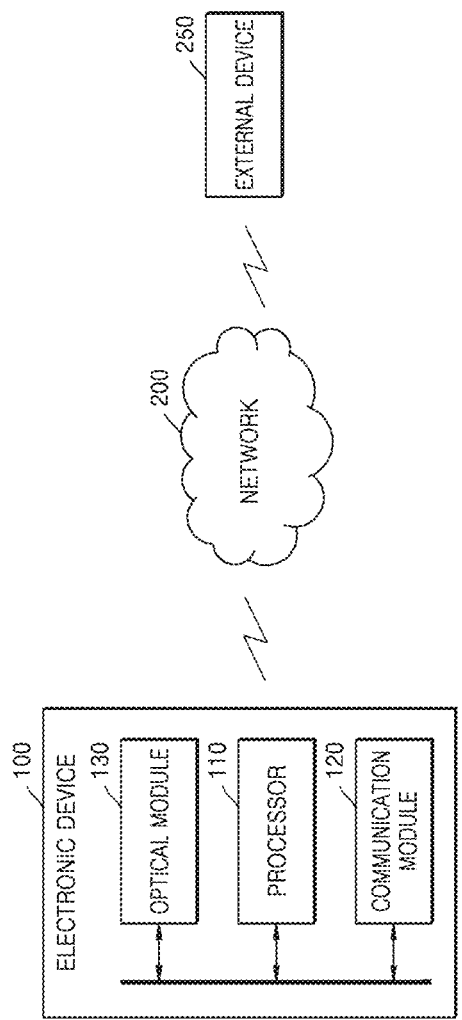
FIG. 2 is a schematic block diagram of a system including an electronic device 100 according to an embodiment of the present disclosure.

FIG. 2 is a schematic block diagram of a system including the electronic device 100 according to an embodiment of the present disclosure.

Referring to FIG. 2, the system may include the electronic device 100 including an optical module 130, a network 200, and an external device 250.

The electronic device 100 according to an embodiment may include the optical module 130, a processor 110, and a communication module 120.

The optical module 130 may radiate light and receive light reflected from an object to measure a distance from the electronic device 100 to the object under the processor 110.

According to an embodiment, the optical module 130 may include one or more light sources that radiate light, a distance detection sensor that receives light reflected from the object and detects a distance, and an element that changes a path of transmitted and received light, in which the one or more light sources may be integrated in one piece with the distance detection sensor or the element.

According to an embodiment, the element may rotate in a transverse direction and/or in a direction that is different from the transverse direction.

The communication module 120 may perform communication between the electronic device 100 and the external device 250 under control of the processor 110.

The processor 110 may include the optical module 130 and the communication module 120 to control an overall operation of the electronic device 100.

According to an embodiment, the processor 110 may perform touch input processing or gesture recognition processing based on information about the measured distance to the object from the optical module 130.

According to an embodiment, the processor 110 may determine one or more interaction points based on the information about the distance to the object.

According to an embodiment, the processor 110 may determine the one or more interaction points based on an interaction group determined based on the information about the distance to the object, an interaction type of the determined interaction group, or an interaction type determined based on the information about the distance.

According to an embodiment, the processor 110 may determine a main interaction point associated with the one or more interaction points based on at least one of a direction in and a speed at which the one or more interaction points move.

According to an embodiment, the processor 110 may adjust a control factor for controlling the optical module 130 based on environment information. The environment information may include at least one of a size of a region associated with an operating range of the object, a type of an application used together with the electronic device 100 or a type of an application associated with a motion of the object, and information associated with a surrounding environment of the electronic device 100.

According to an embodiment, the processor 110 may obtain the environment information from at least one of a user input, an image-obtaining sensor, a surrounding environment detection sensor, and information detected by the optical module 130.

The network 200 may include any network enabling communication between the electronic device 100 and the external device 250. The network 200 may include a wired network, a wireless network, and a short-range communication network.

The external device 250 may receive data from the electronic device 100 through the network 200 or transmit data to the electronic device 100.

According to an embodiment, the external device 250 may receive the information about the distance to the object from the electronic device 100 and perform gesture analysis by using the received information about the distance.

Figure 3:
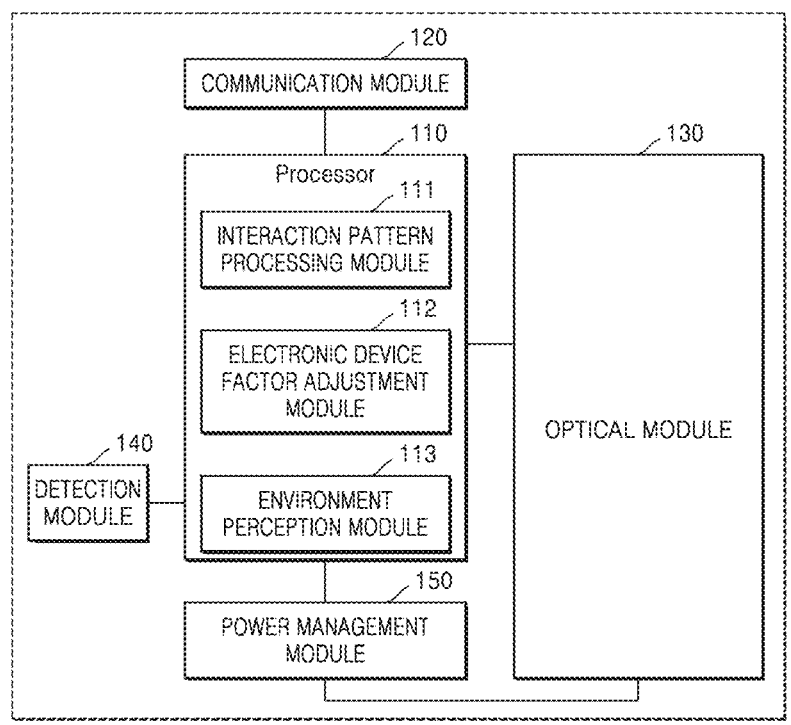
FIG. 3 is a detailed block diagram of an electronic device 100 according to an example of an embodiment.

FIG. 3 is a detailed block diagram of the electronic device 100 according to an example of an embodiment.

Referring to FIG. 3, the electronic device 100 may include the processor 110, the communication module 120, the optical module 130, a detection module 140, and a power management module 150.

The communication module 120 may use Wireless Fidelity (WiFi), Bluetooth (BT), a universal serial bus (USB), or the like, and may use a transmission control protocol (TCP)/Internet protocol (IP) or socket, etc., as a communication protocol.

The optical module 130 may transmit light and measure a distance to an object by using light reflected from the object.

The detection module 140 may recognize a surrounding environment of the electronic device 100 or detect information about the surrounding environment.

According to an embodiment, the detection module 140 may include a camera to detect information about a size of a space where the object makes a touch or gesture or to detect a color, etc., of the object.

The power management module 150 may use an internal battery or an external battery as a power source. The battery may include a cell such as a solar cell, obtained from natural energy like solar heat.

The processor 110 may perform an overall control over internal components of the electronic device 100 and include an interaction pattern processing module 111, an electronic device factor adjustment module 112, and an environment perception module 113.

The interaction pattern processing module 111 may receive the information about the distance to the object from the optical module 130 and determine an interaction type of the object by using a filter that grasps a previously stored interaction pattern. For example, the interaction type of the object may indicate one finger, two fingers, a pen, a motion of typing a virtual keyboard, etc.

The electronic device factor adjustment module 112 may adjust a factor value of the optical module 130, for example, a rotating speed of a mirror included in the optical module 130, a tilt angle of the mirror, a brightness of a light source, and so forth.

The environment perception module 113 may perceive a surrounding environment of the electronic device 100. The surrounding environment of the electronic device 100 may include a size of a space where a gesture is made, a size of a space where a touch is made, whether a person is typing a virtual keyboard, an intensity of light of the surrounding environment, and so forth.

Figure 4:
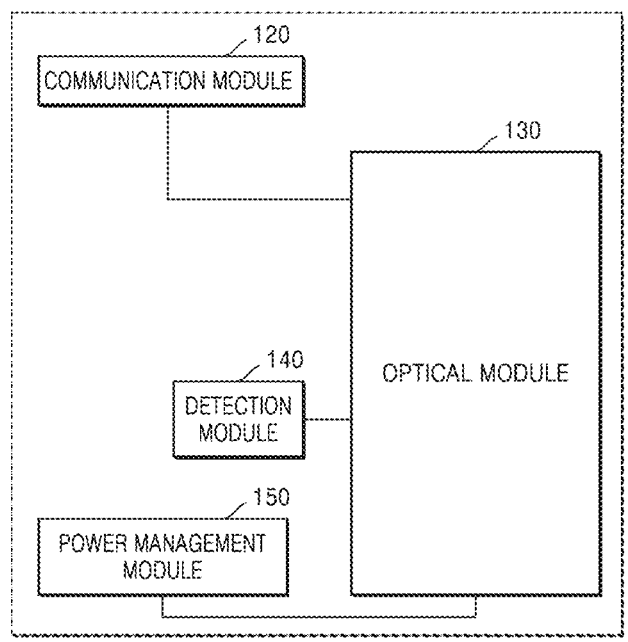
FIG. 4 is a detailed block diagram of an electronic device 100 according to an example of an embodiment.

FIG. 4 is a detailed block diagram of the electronic device 100 according to an example of an embodiment.

Referring to FIG. 4, the electronic device 100 may include the communication module 120, the optical module 130, the detection module 140, and the power management module 150.

The example shown in FIG. 4 is the same as the electronic device 100, but may not include the processor 110. The electronic device 100 shown in FIG. 4 may transmit the information about the distance to the object, which is received from the optical module 130, to an external device through the communication module 120, and the external device may perform gesture analysis and touch analysis by using the received information about the distance to the object.

Figure 5:
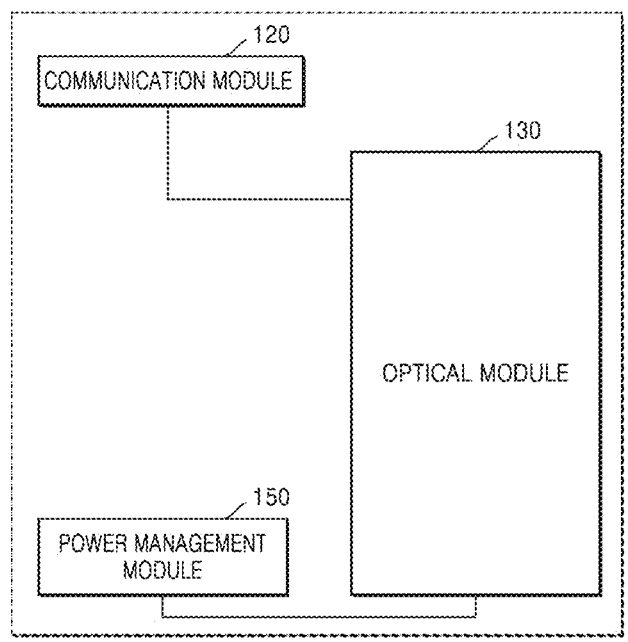
FIG. 5 is a detailed block diagram of an electronic device 100 according to an example of an embodiment.

FIG. 5 is a detailed block diagram of the electronic device 100 according to an example of an embodiment.

Referring to FIG. 5, the electronic device 100 may include the communication module 120, the optical module 130, and the power management module 150.

The example shown in FIG. 5 is the same as the electronic device 100, but may not include the detection module 140. The electronic device 100 shown in FIG. 5 may receive the information detected by the detection module 140 from the connected external device through the communication module 120. A separate external camera capable of playing a role of the detection module 140 may be connected to the electronic device 100, and the electronic device 100 may receive the information through the external camera.

Figure 6:
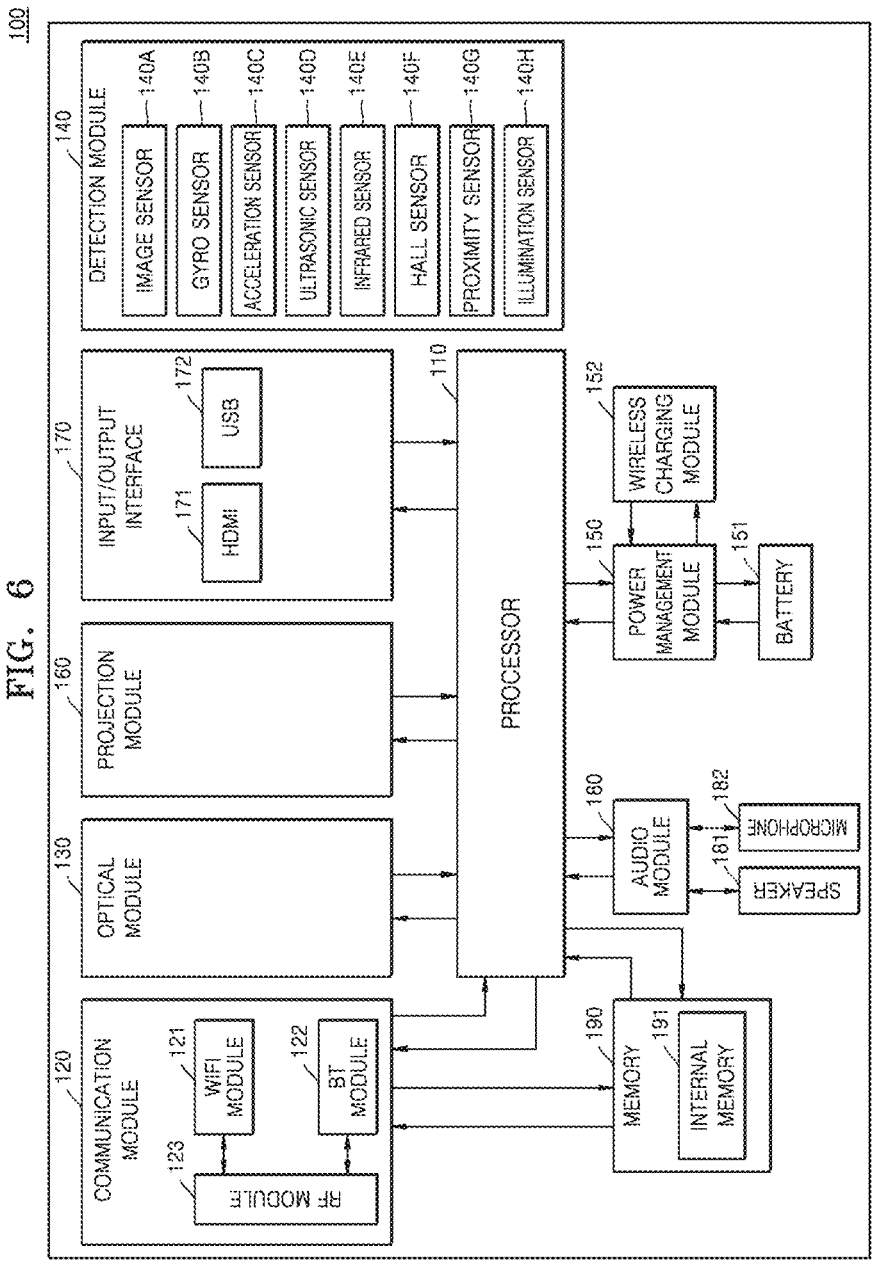
FIG. 6 is a detailed block diagram of an electronic device 100 according to an example of an embodiment.

FIG. 6 is a detailed block diagram of the electronic device 100 according to an example of an embodiment.

Referring to FIG. 6, the electronic device 100 may include one or more processors 110, the communication module 120, the optical module 130, the detection module 140, the power management module 150, a projection module 160, an input/output interface 170, an audio module 180, and a memory 190.

The processor 110 may control multiple hardware or software components connected to the processor 110 by driving an operating system (OS) or an application program, and perform processing and operations with respect to various data including multimedia data. The processor 110 may be implemented with, for example, a system on chip (SoC). According to an embodiment, the processor 110 may further include a graphic processing unit (GPU, not shown).

According to an embodiment, the processor 110 may determine touch information and/or gesture information of the object based on the information about the distance to the object, received from the optical module 130.

The communication module 120 may perform data transmission/reception in communication between the electronic device 100 and other electronic devices, e.g., another electronic device or a server, which are connected thereto through a network. According to an embodiment, the communication module 120 may include a WiFi module 121, a BT module 122, and a radio frequency (RF) module 123.

Each of the WiFi module 121 and the BT module 122 may include, for example, a processor for processing data transmitted and received through a corresponding module. Although it is shown in FIG. 6 that the WiFi module 121 and the BT module 122 are illustrated as separate blocks, at least some (e.g., two or more) of the WiFi module 121 and the BT module 122 may be included in one integrated chip (IC) or an IC package. For example, at least some of processors corresponding to the WiFi module 121 and the BT module 122 may be implemented in one SoC.

The RF module 123 may transmit/receive data, for example, an RF signal. The RF module 123 may include a transceiver, a power amp module (PAM), a frequency filter, a low noise amplifier (LNA), or the like, though not shown. Further, the RF module 123 may further include a part for transmitting/receiving electromagnetic waves over a free air space in wireless communication, for example, a conductor, a conducting wire or the like. While it is shown in FIG. 6 that the WiFi module 121 and the BT module 122 share the RF module 123, at least one of the WiFi module 121 and the BT module 122 may perform transmission and reception of the RF signal through separate RF modules according to an embodiment.

According to an embodiment, the communication module 120 may deliver the gesture information or touch information determined by the processor 110 or the information about the distance to the object, detected by the optical module 130, to the external device.

The optical module 130 may include a light source, a rotational mirror device, a distance measurement device, etc., radiate light to an object, receive light reflected from the object, and measure a distance to the object therefrom. The optical module 130 will be described in detail with reference to FIGS. 8 and 9.

The detection module 140 may measure physical quantity or sense an operation state of the electronic device 100 to convert the measured or sensed information into an electric signal. The detection module 140 may include, for example, at least one of an image sensor 140A, a gyro sensor 140B, an acceleration sensor 140C, an ultrasonic sensor 140D, an ultraviolet (UV) sensor 140E, a hall sensor 140F, a proximity sensor 140G, and an illumination sensor 140H. Additionally or alternatively, the detection module 140 may include, for example, an E-nose sensor (not shown), an electromyography (EMG) sensor (not shown), an electroencephalogram (EEG) sensor (not shown), an electrocardiogram (ECG) sensor (not shown), an iris sensor, a fingerprint sensor, and a pressure sensor (not shown), etc. The detection module 140 may further include a control circuit for controlling at least one sensor included therein.

According to an embodiment, the detection module 140 may detect the surrounding environment of the electronic device 100, for example, a brightness of the light, a color of the object, a size of the space where the gesture or the touch is made, and so forth, by using at least one sensor included therein.

The power management module 150 may manage power of the electronic device 100. The power management module 150 may include, for example, a power management integrated circuit (PMIC), a charger IC, or a battery fuel gauge. The PMIC may be mounted, for example, in ICs or SoC semiconductors. The charging methods may be classified into wired charging and wireless charging. The charger IC may charge a battery and prevent inflow of excessive voltage or excessive current from a charger. According to an embodiment of the present disclosure, the charger IC may include a charger IC capable of performing at least one of the wired charging method and the wireless charging method.

The wireless charging module 152 may include a circuit capable of performing wireless charging, for example, a coil loop or a circuit such as a resonant circuit, a rectifier, etc., and the wireless charging method may include, for example, a magnetic resonance method, a magnetic induction method, an electromagnetic wave method, and so forth.

The battery 151 may store or generate electricity and supply power to the electronic device 100 using the stored or generated electricity. The battery 151 may include, for example, a rechargeable battery and/or a solar battery.

The projection module 160 may include an illumination module and a projection module. The projection module may display an image through projection of light onto a screen. A manner in which the projection module projects the light may include data loss prevention (DLP), liquid crystal on silicon (LCOS), 3 liquid crystal display (3LCD), LCD, a laser scheme, and so forth.

According to an embodiment, the projection module 160 may project an image and the optical module 130 may detect a user gesture on the projected image.

The input/output interface 170 may include, for example, a high-definition multimedia interface (HDMI) 171 and a USB 172. Additionally or alternatively, the input/output interface 170 may include a mobile high-definition link (MHL) interface, an SD/multi-media card (MMC) interface, or an Infrared Data Association (IrDA) interface.

The audio module 180 bi-directionally converts sound and an electric signal. The audio module 180 may process sound information input or output through a speaker 181 or a microphone 182.

The memory 190 may include an internal memory 191. The internal memory 191 may include, for example, at least one of a volatile memory (e.g., dynamic random-access memory (DRAM), a static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.).

The memory 190 stores various data, programs, or applications for driving and controlling the electronic device 100 under control of the processor 110. The memory 190 may store signals or data input/output corresponding to driving of the one or more processors 110, the communication module 120, the detection module 140, the optical module 130, the input/output interface 170, the audio module 180, and the power management module 150.

Each of the foregoing elements of the electronic device 100 according to the present disclosure may be configured with one or more components, names of which may vary with a type of the electronic device 100. In various embodiments, the electronic device 100 may include at least one of the foregoing elements, some of which may be omitted or to which other elements may be added. In addition, some of the elements of the electronic device 100 according to various embodiments may be integrated into one entity to perform functions of the corresponding elements in the same manner as before they are integrated.

Hereinbelow, the optical module 130 included in the electronic device 100 will be described in detail.

According to an embodiment, the optical module 130 may include one or more light sources, a light path change element configured to change a path of light from the one or more light sources and to deliver the light to the object, a distance detection sensor configured to receive light reflected from the object and thereby detect the distance to the object from the electronic device 100 based on the reflected light, and a rotation element configured to rotate the light path change element.

According to an embodiment, a mirror, a lens, a prism, etc., may be used as the light path change element.

As the distance detection sensor, for example, a time-of-flight (TOF) distance sensor, without being limited thereto, may be used, and any sensor capable of detecting a distance may be used.

According to an embodiment, the rotation element may include at least one of a rotation support configured to rotate the light path change element in a transverse direction or a tilt support configured to rotate the light path change element in a direction that is different from the transverse direction.

The optical module 130 may be mentioned as an optical device used for distance detection. The optical module 130 may effectively detect the distance to the object without increasing a volume thereof, by including the light path change element that changes the path of light and the rotation element that rotates the light path change element, in addition to a small distance detection sensor. By miniaturizing the optical module 130 or the optical device that detects the distance to the object, the optical module 130 or the optical device according to an embodiment may be conveniently and effectively used in various fields.

For example, such an optical device may be mounted on and used together with a portable projection device.

The optical device may detect a user's touch or gesture associated with a screen attached to a part of a television (TV) display and displayed on the TV.

For example, the optical device may be mounted on and used together with a small-size drone.

The optical device may be mounted on and used together with glasses implementing virtual reality.

Figure 7:
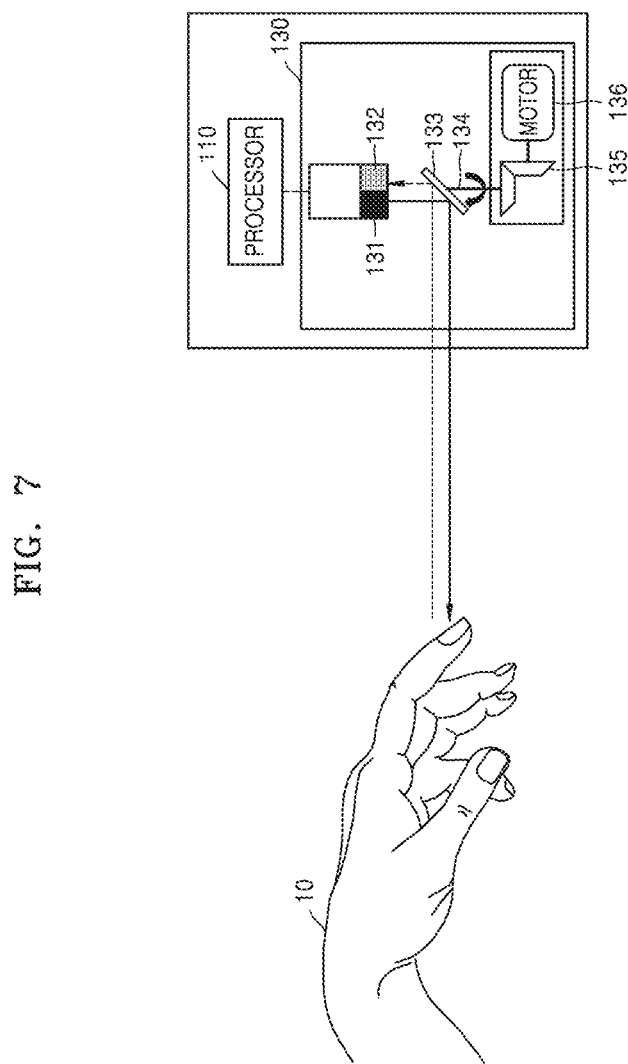
FIG. 7 is a detailed block diagram of an optical module 130 included in an electronic device 100 according to an embodiment.

FIG. 7 is a detailed block diagram of the optical module 130 included in the electronic device 100 according to an embodiment.

Referring to FIG. 7, the optical module 130 may include a light transmitter 131, a distance measurement sensor 132, a mirror 133, a rotation support 134, a gear 135, and a motor 136.

The light transmitter 131 may transmit infrared (IR) light. The light transmitter 131 may use a light-emitting diode (LED) module.

The distance measurement sensor 132 may include a light receiver to receive light reflected from the mirror 133, analyze characteristics of the received light, and measure the distance from the electronic device 100 to the object 10. The distance measurement sensor 132 may include a TOF distance sensor. The TOF technology involves a method of measuring a distance between a sensor and an object based on a time difference between when a signal is output to the object and when the signal comes back after reflected from the object. Various types may be used as a carrier for carrying a signal, and the most general types may be sound and light.

The mirror 133 may reflect the light received from the light transmitter 131 and deliver the light to the object 10. The light may be delivered to a particular position according to an angle and a reflection angle of the mirror 133. The light delivered in this way may be reflected from a particular object, i.e., the object 10, and come back to the mirror 133 or may be lost. Although the mirror 133 is illustrated in FIG. 7, implementation of embodiments does not have to be limited to a mirror, and selectively, other elements capable of changing the path of the received light and delivering the light to the object 10 may be used. For example, a prism or lens may be used as another element.

The mirror 133 may be rotated about 360 degrees by the motor 136, the gear 135, and the rotation support 134 to detect a nearby object and to obtain information about a distance at which the object is located. The mirror 133 may be rotated variously according to an angle the rotation support 134 rotates.

As the mirror 133, a material capable of reflecting light well through chemical vapor deposition (CVD) or the like may be used. For example, gold (Au) or silver (Ag) may be used as the material for the mirror 133.

The rotation support 134 may be connected to the mirror 133 to rotate the mirror 133 a specific angle. For example, when light scanning ranges about 60 degrees and the rotation support 134 moves about 1 degree each time, the rotation support 134 may scan a range of about 60 degrees by moving about 60 times.

According to an embodiment, by subminiaturizing the mirror 133, the rotation support 134, the gear 135, and the motor 136 using a micro electro mechanical systems (MEMS) technology, the volume of a product may be significantly reduced.

According to an embodiment, the motor 136 may be implemented using a small-size, low-power, and low-noise motor using a piezo-electric effect.

According to an embodiment, top/bottom/left/right positions of the gear 135 may be changed depending on the motor 136.

Figure 8A:
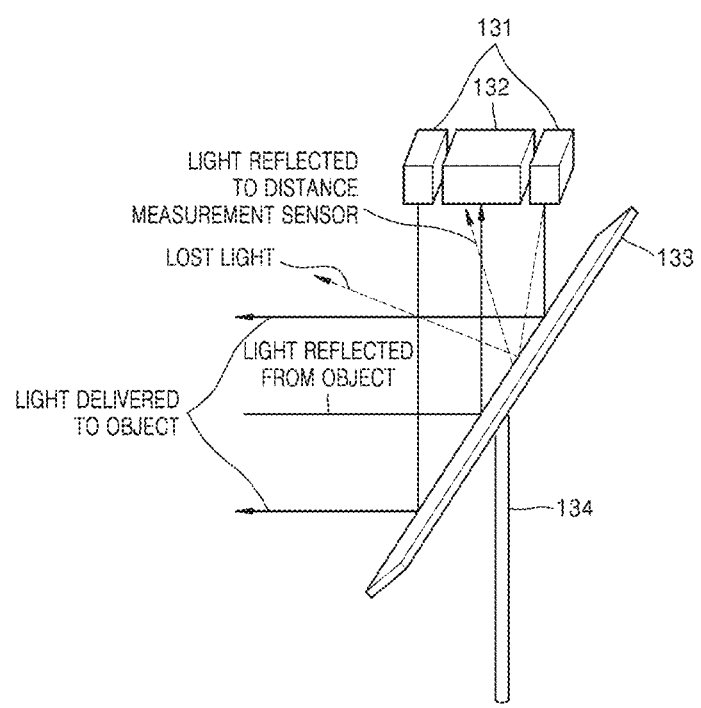
FIG. 8A illustrates an example of an optical module in which a light transmitter and a distance measurement sensor are arranged together, according to an embodiment.

FIG. 8A illustrates an example of the optical module in which the light transmitter and the distance measurement sensor are arranged together according to an embodiment.

Referring to FIG. 8A, the light transmitter 131 and the distance measurement sensor 132 that receives light are integrated in one piece with each other. When the light transmitter 131 and the distance measurement sensor 132 are integrated in one piece, light transmitted from the light transmitter 131 may be reflected to the mirror 133 and delivered to the object. The light transmitted from the light transmitter 131 is not only reflected from the mirror 133 and delivered to the object, but also partially lost or reflected from the mirror 133 and then absorbed by the distance measurement sensor 132. Therefore, the light received by the distance measurement sensor 132 may include the light reflected from the object and the light from the light transmitter 131, which is to be absorbed after reflected from the mirror 133. Since the light absorbed in this way acts as noise, the light may be a factor that disturbs accurate measurement of the distance by the distance measurement sensor 132 based on the light reflected from the object.

Figure 8B:
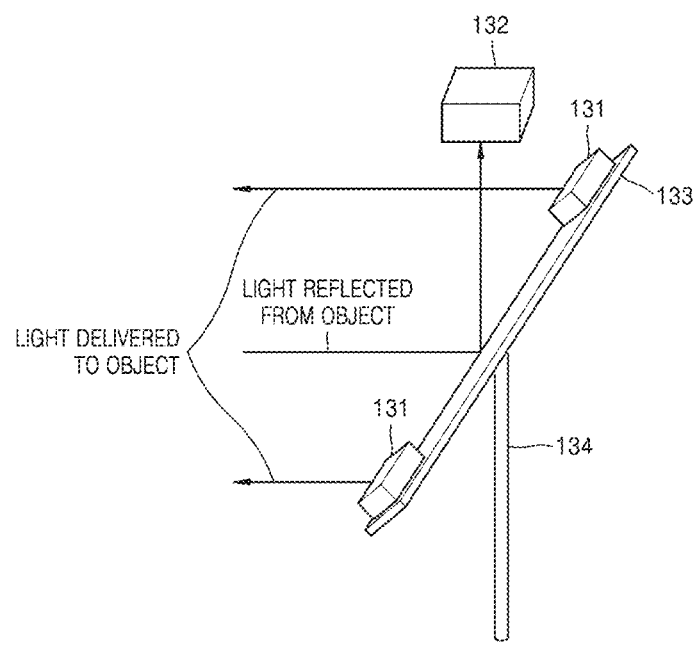
FIG. 8B illustrates an example of an optical module in which a light transmitter is arranged on a mirror, according to an embodiment.

FIG. 8B illustrates an example of an optical module in which a light transmitter is arranged on a mirror, according to an embodiment.

Referring to FIG. 8B, the light transmitter 131 is integrated in one piece with the mirror 133 by being arranged on the mirror 133. By arranging the light transmitter 131 on the mirror 133 in this way, the light from the light transmitter 131 may avoid being reflected from the mirror 133 and thus be directly delivered to the object, thus to prevent the light from the light transmitter 131 from being lost or absorbed in the distance measurement sensor 132. Therefore, the distance measurement sensor 132 may receive just the light reflected from the object, promoting accuracy of distance measurement.

Due to scattering and refraction properties of light, even a mirror reflecting light fully may not have an efficiency of 100%. Thus, by arranging the light transmitter 131 on the mirror 133, scattering or distortion of light may be reduced.

According to an embodiment, the mirror 133 may be rotated along with rotation of the rotation support and the mirror 133 may also be tilted.

Figure 8C:
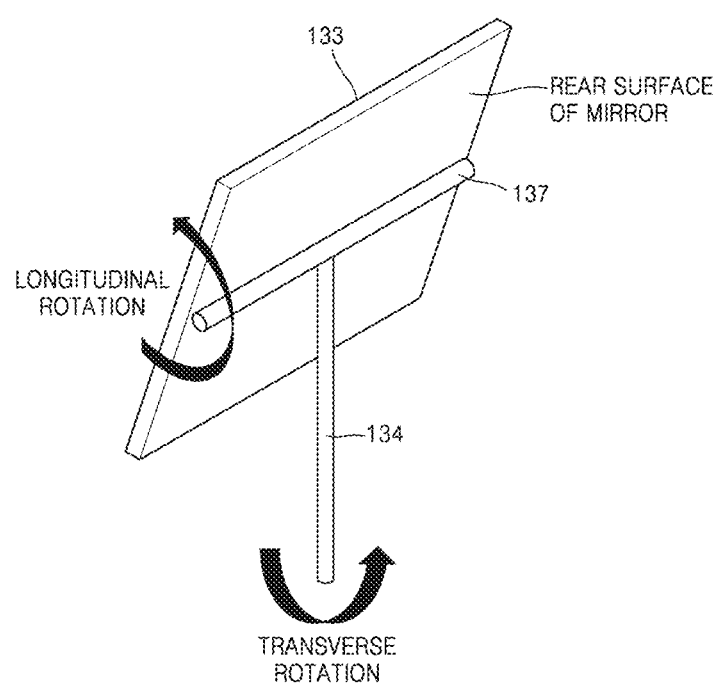
FIG. 8C illustrates an example of an optical module in which a mirror is tiltable, according to an embodiment.

FIG. 8C illustrates an example of an optical module in which a mirror is tiltable, according to an embodiment.

Referring to FIG. 8C, the mirror 133 may further include a tilt support 137 that rotates in a longitudinal direction on a rear surface thereof as well as the rotation support 134 that rotates in the transverse direction. The mirror 133 may scan the object in a left-right direction by being rotated by the rotation support 134, and may scan the object in a top-bottom direction by being rotated by the tilt support 137. Hence, the electronic device 100 may detect two-dimensional (2D) data regarding information about a distance to the object through scanning of the mirror 133 in the left-right direction and detect three-dimensional (3D) data regarding information about the distance to the object through scanning of the mirror 133 in the left-right direction and in the top-bottom direction. According to an embodiment of the present disclosure, the tilt support 137 may be attached in a diagonal direction on the rear surface of the mirror 133 to cause the mirror 133 to scan the object in the diagonal direction and thus to detect 3D data. According to an embodiment of the present disclosure, the diagonal direction means an arbitrary direction between the longitudinal direction and the transverse direction.

According to an example, for rotation of the mirror 133 in the longitudinal direction, up/down of the mirror 133 may be adjusted by gear manipulation using a general motor or a tilt may be precisely adjusted using a material having a form that changes with electricity applied in a piezo manner.

When a linear motor is used for a longitudinal rotation axis, the height of the mirror 133 may be adjusted in the top-bottom direction, enabling various 3D data measurement. In this way, through 3D data scanning using a tilt or a linear motor, a force touch or hovering may be detected.

FIG. 8D is a diagram for describing an operating principle in an optical module in which a mirror is tiltable, according to an embodiment.

Referring to FIG. 8D, the mirror 133 may be tilted in the longitudinal direction, along with rotation of the tilt support 137. The light transmitted from the light transmitter 131 when the mirror 133 is tilted a first tilt angle is reflected from the mirror 133 and is radiated to a position 810 of the object. Thus, the light received in the distance measurement sensor 132 after reflected from the position 810 of the object may indicate information about a distance to the position 810 of the object. The light transmitted from the light transmitter 131 when the mirror 133 is tilted a second tilt angle is reflected from the mirror 133 and is radiated to a position 820 of the object. Thus, the light received in the distance measurement sensor 132 after reflected from the position 820 of the object may indicate information about a distance to the position 820 of the object.

In this way, when the mirror 133 of the electronic device 100 performs scanning with an angle change in the longitudinal direction, that is, in the top-bottom direction, together with the transverse rotation, the information about the distance to the object may be detected using a wider viewing angle. For example, when a touch by a user's finger is detected, information about a distance in the top-bottom direction of the finger may also be detected. In this way, not only the touch, but also the hovering or force touch may be detected.

Figure 9:
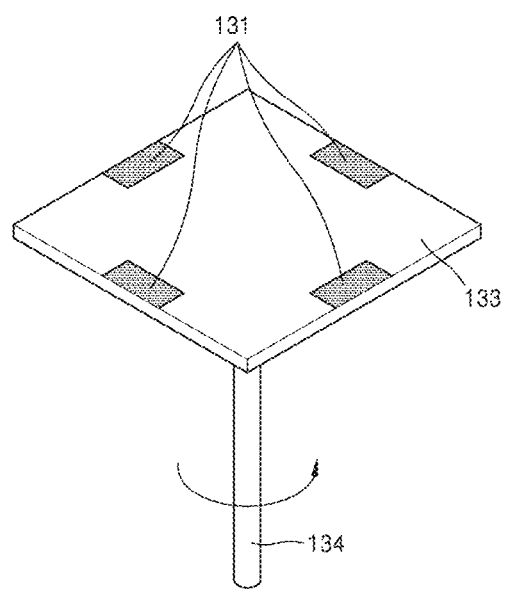
FIG. 9 illustrates an example in which a light-emitting diode (LED) module is attached to a mirror in four directions, according to an embodiment.

FIG. 9 illustrates an example in which an LED module is attached in four directions of a mirror, according to an embodiment.

Referring to FIG. 9, the light transmitter 131 is transmitted in each of four directions on the mirror 133.

According to an embodiment, a structure illustrated in FIG. 9 may adopt the way of directly attaching the light transmitter 131 to the mirror 133 or a semiconductor processing technology.

When the semiconductor processing technology is used, a semiconductor, etc., may be manufactured in a thin-film form and an LED may be directly made thereon. The power may be delivered through a semiconductor thin film, and may be supplied through a support.

According to an embodiment, an LED module may be attached in each of the four directions on the mirror 133, and an electric circuit capable of supplying power using an LED through a conductive film, a material, or CVD processing may be configured. The power may be supplied through the rotation support 134 that rotates the mirror 133.

Figure 10:
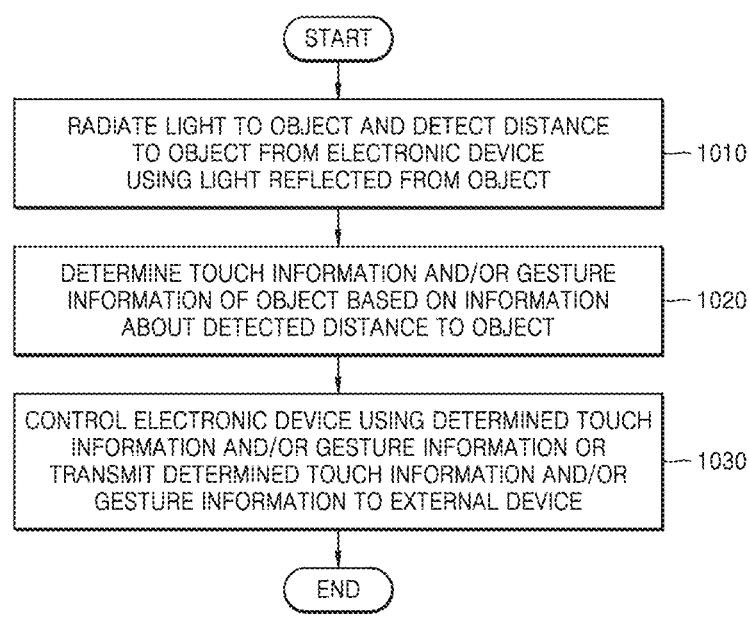
FIG. 10 is a flowchart illustrating an operation method of an electronic device 100, according to an embodiment.

FIG. 10 is a flowchart illustrating an operation method of the electronic device 100 according to an embodiment.

Referring to FIG. 10, in operation 1010, the optical module 130 of the electronic device 100 may radiate light to an object and detect a distance from the electronic device 100 to the object by using light reflected from the object.

FIGS. 11A through 11E illustrate a principle of an electronic device for measuring a distance to an object.

Figure 11A:
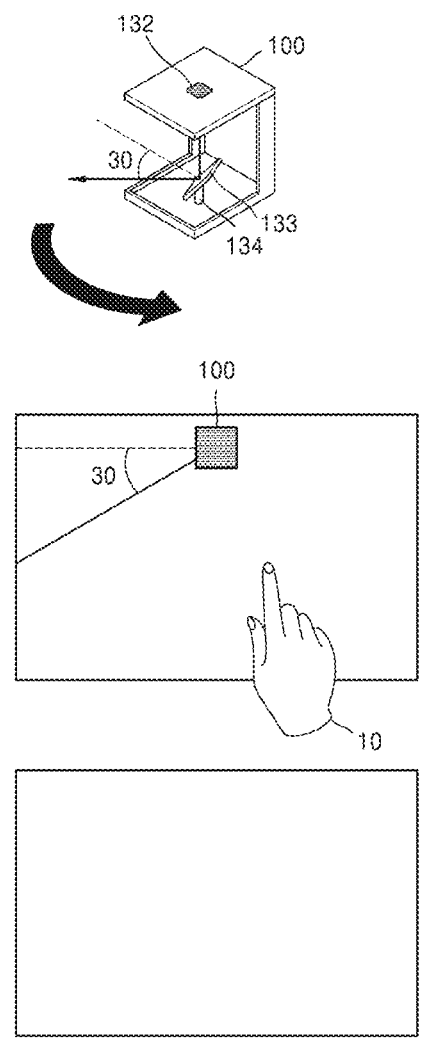
FIGS. 11A, 11B, 11C, 11D and 11E illustrate a principle of an electronic device for measuring a distance to an object.

FIG. 11A shows that the mirror 133 of the electronic device 100 starts scanning from a position distant about 30 degrees from a side surface of the electronic device 100.

Figure 11B:
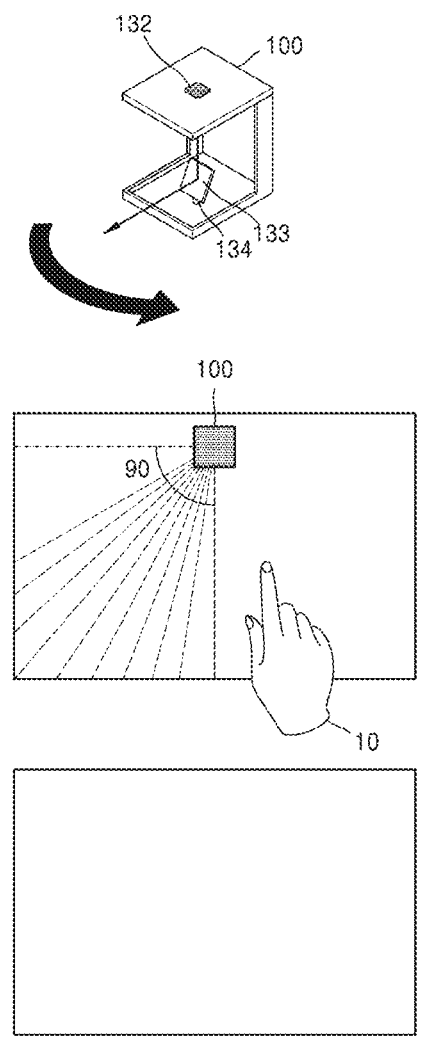

Referring to FIG. 11A, a light transmitter arranged on the mirror 133 or provided separately from the mirror 133 may radiate light, and the mirror 133 may reflect the light radiated from the light transmitter and deliver the light to the object 10 while being rotated a specific angle each time. Referring to FIG. 11A, since there is no object that reflects light at the position distant about 30 degrees, the electronic device 100 may not obtain effective information for use in detection of the object or information about a distance to the object. FIG. 11B shows a case where the mirror 133 of the electronic device 100 moves about 90 degrees.

Referring to FIG. 11B, the mirror 133 radiates light while being rotated a designated angle each time from the position distant about 30 degrees and detects reflected light, thus being rotated about 90 degrees. Up to about 90 degrees, there is no object in the scan range of the electronic device 100, such that the electronic device 100 may not obtain effective information.

Figure 11C:
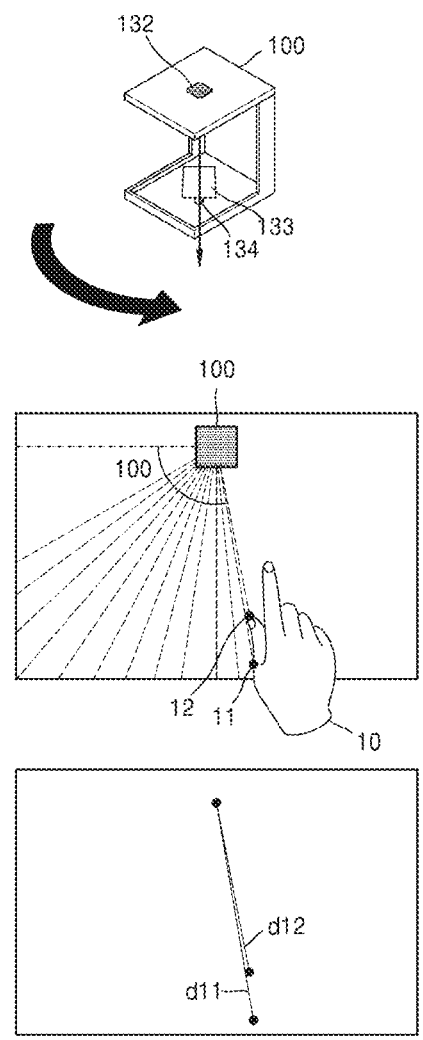

FIG. 11C shows a case where the mirror 133 of the electronic device 100 moves about 100 degrees.

Referring to FIG. 11C, the mirror 133 is rotated about 100 degrees, and the electronic device 100 receives light reflected from positions 11 and 12 of the object 10 and measures distances d11 and d12 to the positions 11 and 12 of the object 10 by using the light reflected from the positions 11 and 12.

Figure 11D:
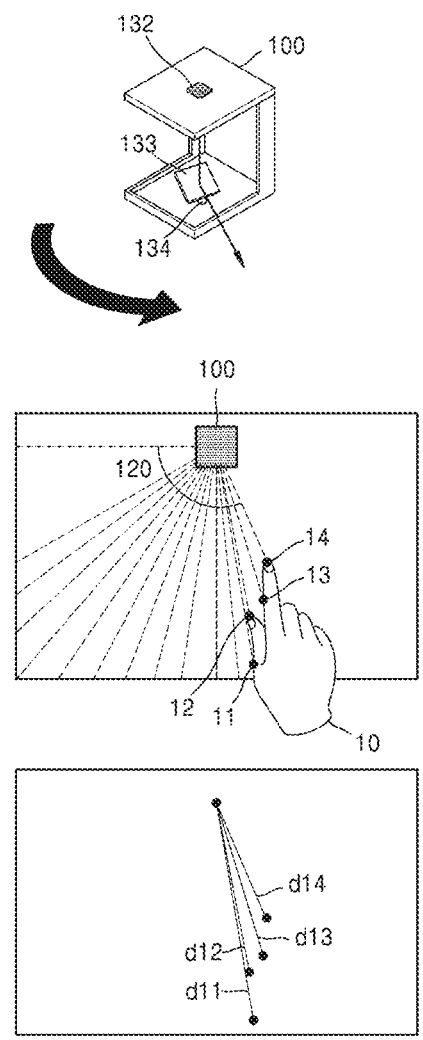

FIG. 11D shows a case where the mirror 133 of the electronic device 100 moves about 120 degrees.

Referring to FIG. 11D, the mirror 133 is rotated about 120 degrees, and the electronic device 100 receives light reflected from positions 13 and 14 of the object 10 and measures distances d13 and d14 to the positions 13 and 14 of the object 10 by using the light reflected from the positions 13 and 14.

Figure 11E:
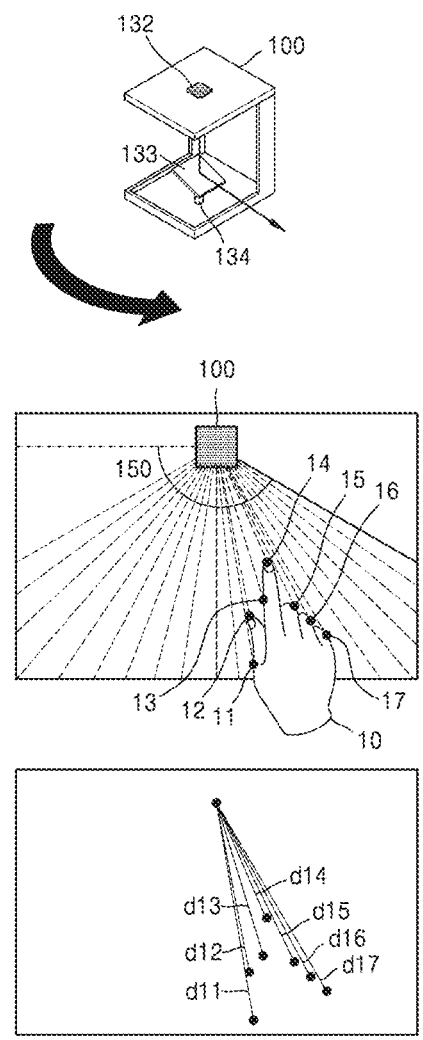

FIG. 11E shows a case where the mirror 133 of the electronic device 100 moves about 150 degrees.

Referring to FIG. 11E, the mirror 133 is rotated about 150 degrees, and the electronic device 100 receives light reflected from positions 15, 16, and 17 of the object 10 and measures distances d15, d16, and d17 to the positions 15, 16, and 17 of the object 10 by using the light reflected from the positions 15, 16, and 17.

As such, the electronic device 100 may rotate the mirror 133 a preset angle, deliver light through the rotated mirror 133, and detect the intensity of light reflected through the mirror 133 from the object, thus detecting a distance to the object from the electronic device 100.

An angle the mirror 133 is rotated each time may be determined variously. For example, to detect a detailed motion of an object, the angle the mirror 133 is rotated each time may be reduced.

A scan range of the mirror 133 may be determined variously from 0 degree to about 360 degrees. For example, when the user makes a gesture using one hand, the scan range of the mirror 133 may be set relatively narrow, and when the user makes a gesture using both hands, the scan range of the mirror 133 may be set relatively wide.

In operation 1020, the processor 110 of the electronic device 100 may determine touch information and/or gesture information of the object based on the information about the detected distance to the object.

According to an embodiment, the electronic device 100 may determine one or more interaction points based on the information about the detected distance to the object.

According to an embodiment, the electronic device 100 may determine an interaction group based on the information about the distance to the object, determine an interaction type of the determined interaction group, or determine an interaction type determined based on the information about the distance. The electronic device 100 may also determine the one or more interaction points based on at least one of the determined interaction group or the determined interaction type.

According to an embodiment, the electronic device 100 may determine a main interaction point associated with the one or more interaction points based on at least one of a direction in and a speed at which the one or more interaction points move.

In operation 1030, the electronic device 100 may control the electronic device 100 by using the determined touch information and/or gesture information or transmit the determined touch information and/or gesture information to an external device. The external device may include a computer, a smartphone, a TV, and so forth.

Although it is illustrated in FIG. 10 that the electronic device 100 determines the touch information and/or the gesture information, the electronic device 100 may deliver the information about the distance to the object to the external device which may then determine the touch information and/or the gesture information.

Figure 12:
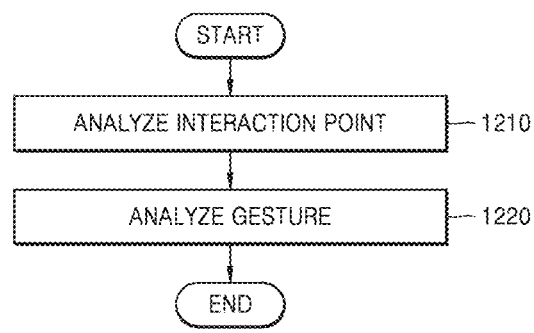
FIG. 12 is a flowchart illustrating a process of a method by which an electronic device 100 determines touch information and/or gesture information of an object based on distance information of the object, according to an embodiment.

FIG. 12 is a flowchart illustrating a process of a method for the electronic device 100 to determine touch information and/or gesture information of an object based on distance information of the object, according to an embodiment.

Referring to FIG. 12, in operation 1210, the electronic device 100 may extract an interaction point.

The interaction point is effective information used for the electronic device 100 to analyze a gesture. For example, when the object is a user's hand, the electronic device 100 may obtain information about an outline of the hand making a motion (corresponding to the information about the distance to the object) as illustrated in FIG. 11E. To determine a gesture type or a touch type to which the motion of the hand of the user is mapped, the electronic device 100 needs to extract only effective information for use in mapping a gesture or a touch from information obtained from an optical module. The electronic device 100 may extract an interaction point as the effective information.

In operation 1220, the electronic device 100 may analyze the gesture.

The electronic device 100 may compare the gesture with a previously stored gesture pattern using an analyzed interaction point and determine a type of the gesture in operation 1210. Examples of the gesture type may include a touch, a single tap, a double tap, a drag, a pinch, a zoom, a virtual keyboard input, etc. The gesture that does not match the previously stored gesture pattern may be ignored or added. According to an example, the user may directly input a user-defined gesture type to the electronic device 100.

Figure 13:
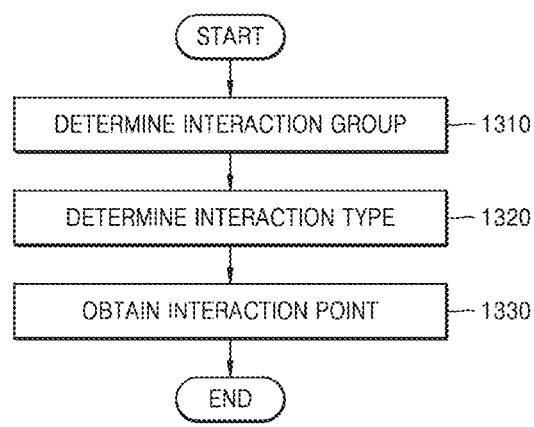
FIG. 13 is a flowchart of a process of extracting an interaction point, according to an embodiment.

FIG. 13 is a flowchart of a process of extracting an interaction point according to an embodiment.

Referring to FIG. 13, in operation 1310, the electronic device 100 may determine an interaction group.

A method for the electronic device 100 to determine an interaction group will be described with reference to FIG. 14 and FIGS. 15A-15E.

Figure 14:
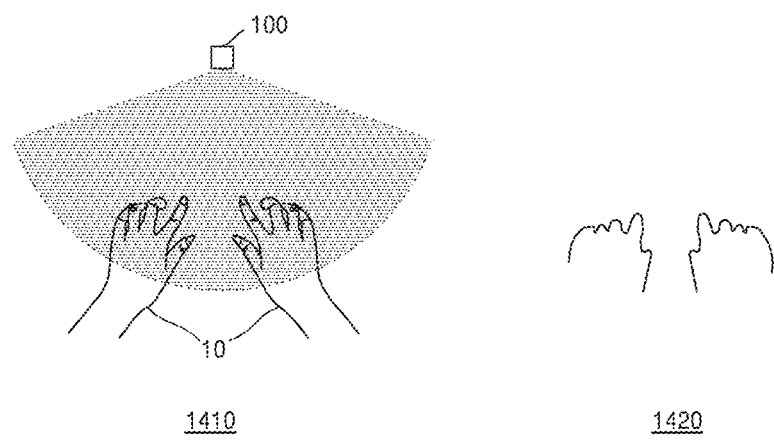
FIG. 14 and FIGS. 15A, 15B, 15C, 15D and 15E are reference diagrams for describing a method by which an electronic device 100 determines an interaction type.

In FIG. 14, "1410" shows the electronic device 100 and the user's hand which is the object 10 that makes a motion in front of the electronic device 100. The electronic device 100 may perform scanning in a range in which the object 10 makes a motion.

In FIG. 14, "1420" shows data corresponding to information about a distance, obtained by scanning the object 10 by the electronic device 100 in the state of 1410.

Figure 15A:
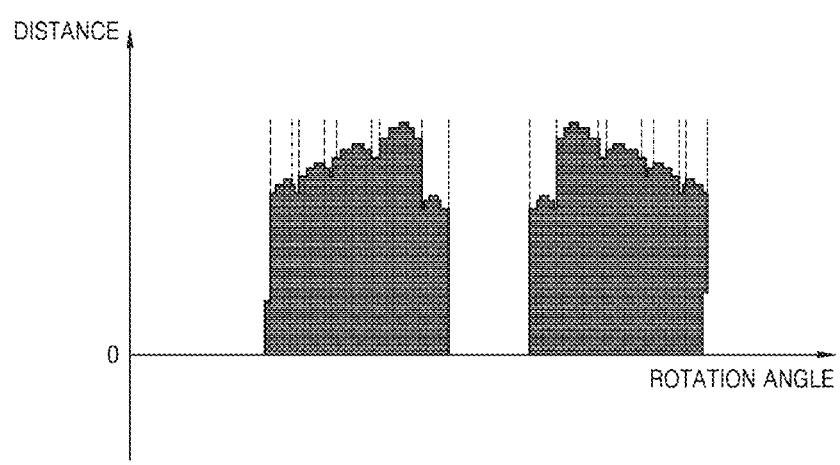

FIG. 15A shows the data shown in 1420 of FIG. 14, that is, 2D data measured by the electronic device 100, which is then reconstructed according to XY coordinates.

Referring to FIG. 15A, a horizontal axis indicates a rotation angle of the mirror and a vertical axis indicates a distance of the object, which is detected based on light reflected from the object after radiated at each rotation angle. When the object is distant from the electronic device, a value of a distance from the object would be large; when the object is close to the electronic device, the value of to distance from the object would be small.

For convenience of a description, it is assumed that the distance in a region where no object is detected has a value of 0 and the distance in a region where the object is detected has a value that is inversely proportional to the distance. The region where no object is detected may include a region that is too distant or close to detect the object.

Figure 15B:
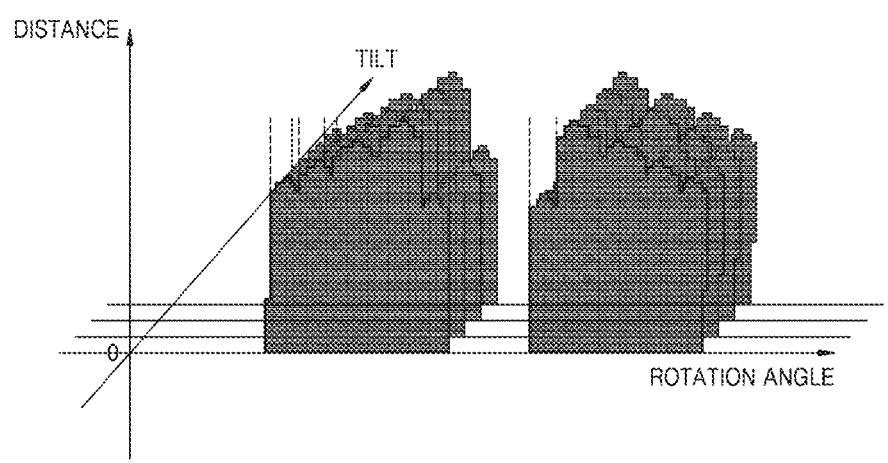

FIG. 15B shows the data shown in 1420 of FIG. 14, that is, 3D data measured by the electronic device 100, which is then reconstructed according to XYZ coordinates.

Referring to FIG. 15B, an x-axis indicates a rotation angle of the mirror, a y-axis indicates a distance of the object, which is detected based on light reflected from the object after radiated at each rotation angle, and a z-axis indicates a tilt at which the mirror moves in the longitudinal direction.

When the tilt support is fixed and the rotation support rotates, 2D data obtained by the electronic device 100 indicates a magnitude of a distance from an object with respect to each rotation angle at the fixed tilt as illustrated in FIG. 15A; whereas when both the tilt support and the rotation support rotate, that is, the mirror scans the object while being tilted, 3D data obtained by the electronic device 100 may indicate a magnitude of a distance from the object with respect to each rotation angle at each tilt as illustrated in FIG. 15B. The tilt support continuously rotates within a preset range, but the electronic device may extract a distance for each specific tilt. Thus, when the mirror scans the object while being tilted unlike when scanning the object at one tilt without being tilted, the electronic device 100 may three-dimensionally obtain information about a distance therefrom to the object, thus acquiring a stereoscopic result regarding the distance to the object.

Figure 15C:
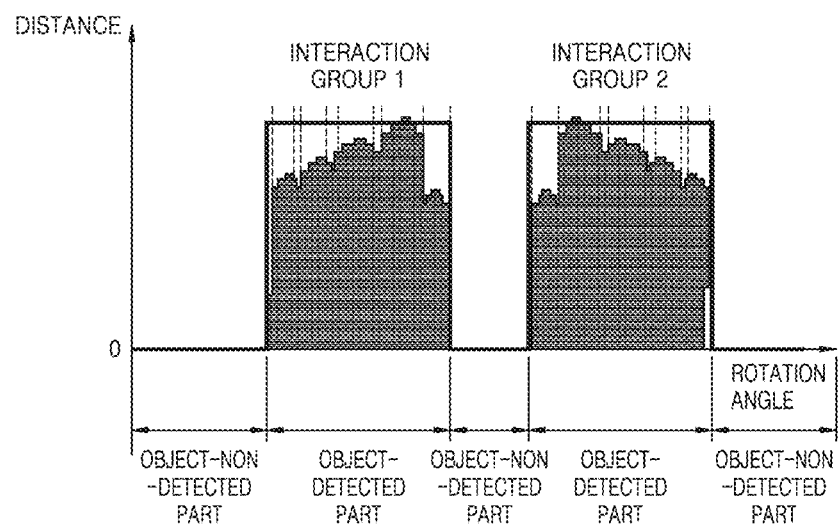

Next, a coarse analysis may be carried out based on the data illustrated in FIG. 15A. Needless to say, the coarse analysis may be also carried out based on the data illustrated in FIG. 15B. Simply, the data illustrated in FIG. 15A is classified into data corresponding to a zero distance from the object and data corresponding to a non-zero distance. Through such classification, as illustrated in FIG. 15C, the data may be grouped into object-detected parts and object-non-detected parts as illustrated in FIG. 15C.

According to an embodiment, a non-zero distance part, that is, the object-detected part may be determined as an interaction group.

In operation 1320, the electronic device 100 may determine an interaction type of the interaction group.

According to an embodiment, the electronic device 100 may determine the interaction type depending on a length by which consecutive non-zero values of 2D data continue. The interaction type of the interaction group may include, for example, a single touch, a pen, a user's hand, a motion of typing a virtual keyboard, and so forth. For the user's hand, whether the hand is of a man, a woman, or a child may be further indicated.

According to whether the object is the user's hand, the pen, the single touch, or the motion of typing the virtual keyboard, the length by which the non-zero values of the 2D data continue may differ. Also, when the object is the user's hand, the length by which the non-zero values of the 2D data continue may also vary with whether the user's hand is of a man, a woman, or a child. For example, when the length by which the non-zero values of the 2D data continue is equal to or greater than about 5 centimeters and less than or equal to about 15 centimeters, the electronic device 100 may determine the interaction type indicating that the object corresponding to the data is the user's hand. When the length by which the non-zero values of the 2D data continue is equal to or less than about 5 centimeters, the electronic device 100 may determine the interaction type indicating that the object corresponding to the data is the pen or a user's finger.

Referring to FIG. 15C, when a length by which non-zero values of 2D data corresponding to an interaction group 1 continue falls within a specific range, the electronic device 100 may determine that the object corresponding to the data is the user's hand. This is also applied to an interaction group 2.

Thus, through such a coarse analysis, the electronic device 100 may determine that: two hands are detected as objects; an interaction type of the interaction group 1 is a user's left hand; and an interaction type of the interaction group 2 is a user's right hand.

According to an example, when the length by which the non-zero values of the 2D data continue is equal to or less than about 5 centimeters or is equal to or greater than about 0.5 centimeter and less than or equal to about 2 centimeters, the electronic device 100 may determine the interaction type indicating that the object corresponding to the data is the pen or the user's finger (corresponding to the single touch). When the object is the pen or the user's finger, the sizes thereof are similar to each other, and thus it may be difficult for the electronic device 100 to determine whether the object is the pen or the user's finger merely from information about the length by which the non-zero values of the 2D data continue. For the similar-size objects, the electronic device 100 may use 3D data to classify types of the objects more specifically.

Figure 16:
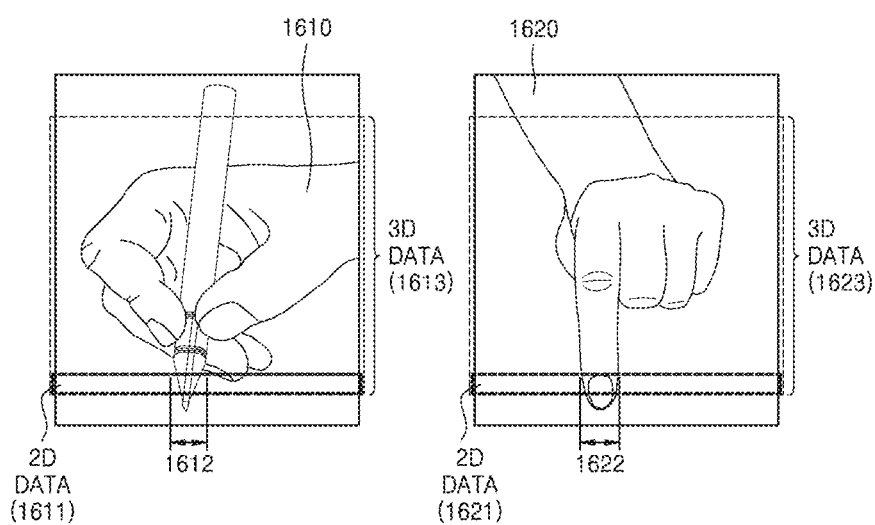
FIG. 16 is a reference diagram for describing two-dimensional (2D) data and three-dimensional (3D) data.

Referring to FIG. 16, an object 1610 corresponding to a case where the user makes a motion while holding a pen with the hand and an object 1620 corresponding to a case where the user makes a motion with a finger are illustrated. 2D distance data obtained in the electronic device 100 by the mirror's scanning the object 1610 while being rotated in the transverse direction without being tilted reflects 2D data 1611, such that an object-detected part in the 2D data 1611 is a part 1612. 2D distance data obtained in the electronic device 100 by the mirror's scanning the object 1620 while being rotated in the transverse direction without being tilted reflects 2D data 1621, such that an object-detected part in the 2D data 1621 is a part 1622. Information available to the electronic device 100 in an analysis of the objects 1610 and 1620 based on the 2D data is limited to 1612 and 1622, making it difficult for the electronic device 100 to determine whether the object is the pen or the user's finger.

However, 3D distance data obtained in the electronic device 100 by the mirror's scanning the object 1610 while being tilted and rotated in the longitudinal direction may reflect 3D data 1613. Also, 3D distance data obtained in the electronic device 100 by the mirror's scanning the object 1620 while being tilted and rotated in the longitudinal direction may reflect 3D data 1623.

As such, when the electronic device 100 obtains 3D data, the electronic device 100 may analyze that the object 1610 holding the pen includes data of the fingers holding the pen, unlike a single touch by the finger and there is a shape of the pen stretched straight upward from the fingers. The analysis of the shape of the pen stretched straight may include estimating the shape of the pen by extracting an edge using a previously stored filter and performing thinning. With such estimation, the electronic device 100 may extract coordinates information of the pen.

Referring back to FIG. 13, in operation 1320, the electronic device 100 may obtain an interaction point.

The electronic device 100 may determine an interaction group, determine an interaction type of the interaction group, and then determine an interaction point of each interaction group.

Figure 15D:
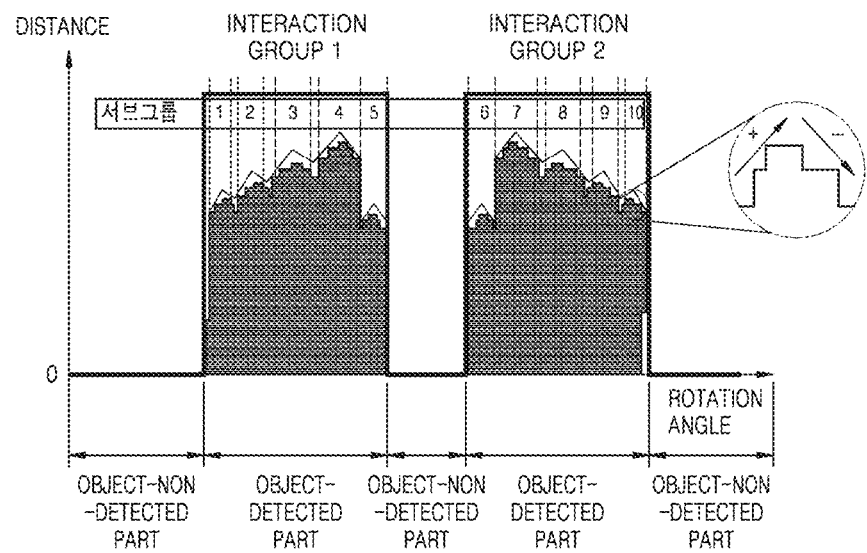

Referring to FIG. 15D, the electronic device 100 may analyze data corresponding to each interaction group separately for detailed sections. For example, the electronic device 100 may analyze the size of data corresponding to the interaction group 1 and determine a part where a slope increases (+) and then decreases (−) as one sub-group. According to such an analysis, the electronic device 100 may determine sub-groups 1, 2, 3, 4, and 5 for the interaction group 1 and sub-groups 6, 7, 8, 9, and 10 for the interaction group 2. The sub-group may be a sub-unit for extracting one or more interaction points from an interaction group.

There may be various methods of determining each sub-group for an interaction group.

The electronic device 100 may determine one or more interaction points for each sub-group determined for the interaction group.

Figure 15E:
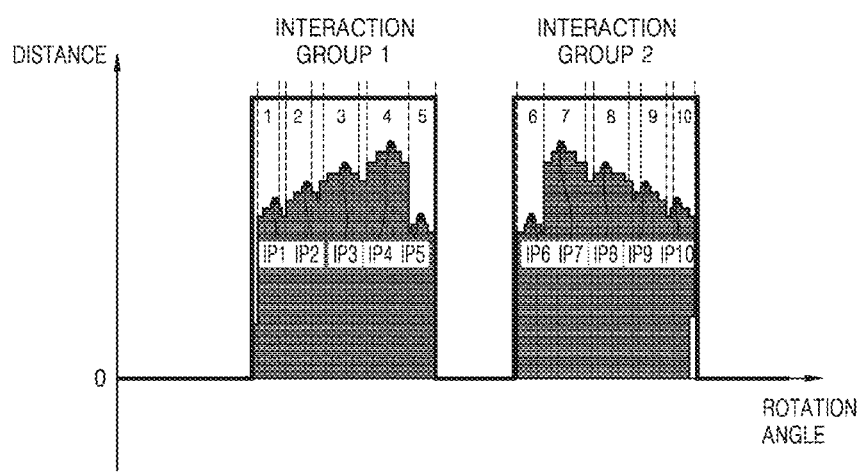

The electronic device 100 may determine in each sub-group of the interaction group, for example, a point having the largest size, a point having a slope close to 0, or a point appearing to be a main point of the sub-group according to various methods, thus determining an interaction point. In FIG. 15E, interaction points IP1 through IP10 are determined for sub-groups, respectively.

According to an embodiment, the electronic device 100 may extract a main interaction point based on the extracted one or more interaction points.

The electronic device 100 according to embodiments may recognize a touch or gesture in a range wider than a narrow range in which an existing smartphone recognizes a gesture. Therefore, a user's touch or gesture may have various patterns. For example, pinch zoom-in/-out may be a big motion and a gesture may be made with a touch by several fingers. Thus, to accurately and effectively determine several gestures or touches having big and various motions, a main interaction point may be further extracted.

Figure 17:
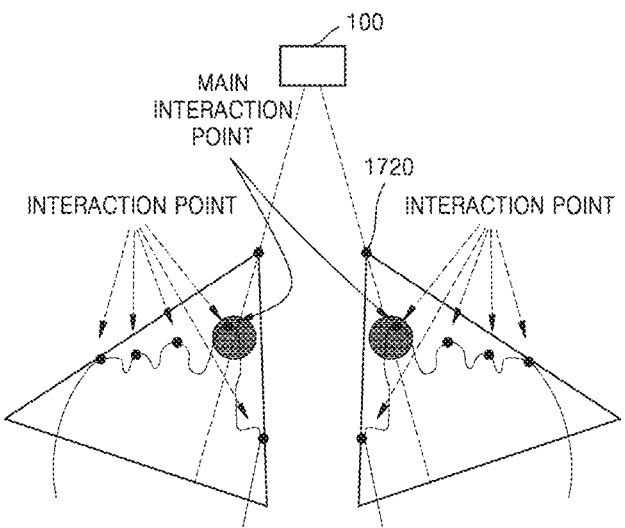
FIG. 17 is a reference diagram for describing a method of extracting a main interaction point, according to an embodiment.

FIG. 17 is a reference diagram for describing a method of extracting a main interaction point according to an embodiment.

Referring to FIG. 17, the electronic device 100 may extract five interaction points for an object that is a user's left hand and five interaction points for an object that is a user's right hand.

The electronic device 100 may also estimate a direction in or a speed at which interaction points move by comparing previous data with current data, in which the previous data and the current data are measured each time when the mirror is rotated. For example, the user may move a hand including all of the five fingers of each hand to carry out pinch zoom-in or pinch zoom-out when touching the flat surface with all the fingers of the both hands. For such a gesture, a motion of an object may be accurately determined by determining a motion of the gesture of the entire hand rather than by determining a motion of a touch with each finger. Thus, in this case, it may be useful to extract a main interaction point capable of representing interaction points rather than to extract each interaction point.

Referring to FIG. 17, the electronic device 100 performs triangulation with respect to the shape of the hand based on data corresponding to the interaction group or based on the interaction points to combine points 1710 and 1720 of vertices close to the electronic device 100 with the measured direction or speed of the hand or finger, thus determining one or more main interaction points.

Figure 18:
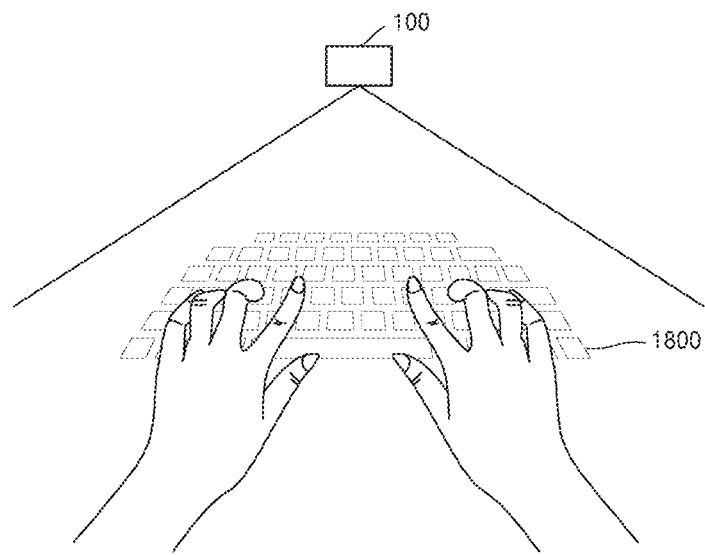
FIG. 18 is a reference diagram for describing an operation when an interaction type is a virtual keyboard, according to an embodiment.

FIG. 18 is a reference diagram for describing an operation when an interaction type is a virtual keyboard, according to an embodiment.

Whether the interaction type is a virtual keyboard 1800 motion may be determined using various methods.

According to an embodiment, the electronic device 100 may make the determination by receiving a signal indicating that the virtual keyboard is executed from a connected external device. For example, when the user clicks a keyboard input part, e.g., an EditText widget in an application program functionally connected with the electronic device 100, the electronic device 100 may receive a keyboard input motion signal from the application program and determine that the virtual keyboard operates.

Alternatively, according to an embodiment, the electronic device 100 may also determine the virtual keyboard motion based on detection of a user's finger pattern, that is, ten fingers as a finger shape.

Alternatively, according to an embodiment, the user may manually set start of a virtual keyboard motion mode.

In the virtual keyboard motion mode, about ten or more interaction points need to be extracted and processed fast within a concentrated narrow range, requiring precise distance information.

In the virtual keyboard motion mode, to precisely scan an input motion, a range in which the motor is rotated may be reduced to hasten a period of scanning a particular position in the same time. For example, the scan range may be changed from about 180 degrees to about 60 degrees. When the scan range is reduced, a resource corresponding to scanning about 180 degrees may be used for scanning about 60 degrees, such that by measuring distance information several times in the same time, precise interaction point extraction may be possible. Alternatively, the degree of precision may be improved by adjusting the brightness of the light source.

Figure 19:
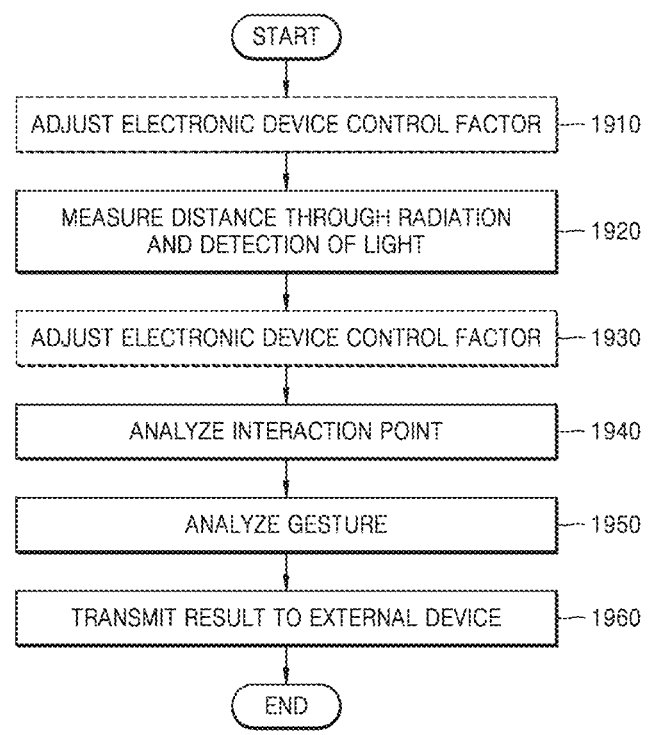
FIG. 19 is a flowchart illustrating an operation method of an electronic device 100, according to an embodiment.

FIG. 19 is a flowchart illustrating an operation method of an electronic device 100 according to an embodiment.

Referring to FIG. 19, in operation 1910, the electronic device 100 may adjust an electronic device control factor.

The electronic device control factor may mainly include a control factor of an optical module included in the electronic device 100.

According to an embodiment, the electronic device 100 may adjust a control factor for controlling the optical module based on environment information.

According to an embodiment, the electronic device 100 may obtain the environment information from at least one of a user input, an image-obtaining sensor like a camera, a surrounding environment detection sensor, and information detected by the optical module.

For example, the environment information may include a size of a region associated with an operating range of the object. Depending on whether the size of the region associated with the operating range of the object is large or small, the electronic device 100 may adjust the intensity of the light source or the rotation range of the mirror differently.

The environment information may include a type of an application used together with the electronic device 100 or a type of an application associated with a motion of the object. The application may indicate a computer program provided to perform a function, a task, or an activity for helping a user's motion. For example, the electronic device may adjust the intensity of the light source or the rotation range of the mirror differently according to the type of the application. To detect a motion of the object associated with the virtual keyboard, which needs precise gesture recognition, the electronic device 100 may control scanning to be performed several times by increasing the intensity of the light source or the rotation speed of the mirror.

For example, the environment information may include information associated with the surrounding environment of the electronic device 100. The information associated with the surrounding environment of the electronic device 100 may include a brightness of ambient light.

Adjustment of the electronic device control factor may include adjustment of the intensity of the light source. The intensity of the light source may be automatically or manually adjusted according to a distance of the object to be detected, an intensity of light in a surrounding environment, or characteristics of the object. For example, the electronic device 100 may adjust the intensity of the light source to be strong when the object is distant. The electronic device 100 may adjust the intensity of the light source to be strong when the intensity of ambient light is strong. For example, the electronic device 100 may adjust the intensity of the light source to be strong when the object appears dark. The electronic device 100 may adjust the intensity of the light source to be strong when the user's skin color is dark. In this way, detection of light reflected from the object may be made easy.

Adjustment of the electronic device control factor may include adjustment of the rotation speed of the mirror included in the optical module. The rotation speed of the mirror may differ with the response speed of the distance detection sensor, rotation of the mirror, and a type and a speed of the motor that rotates the mirror. For example, to detect a fine gesture, the electronic device 100 may obtain much data in the same time by setting the rotation speed of the mirror to be high and thus performing scanning several times.

Adjustment of the electronic device control factor may include adjustment of the rotation speed of the mirror included in the optical module. Basically, the mirror may be rotated about 360 degrees by the rotation support. However, the mirror does not have to be rotated 360 degrees at all times to scan the object, and thus the rotation range of the mirror may be adjusted variously according to the object to be scanned or the gesture of the object to be scanned. For example, when the user makes a gesture with a single hand, the scan range of the mirror is narrow such that the electronic device 100 may set the rotation range narrow; when the user makes a gesture with both hands, the scan range of the mirror is wide such that the electronic device 100 may set the rotation range wide.

Adjustment of the electronic device control factor may include adjustment of the tilt range of the mirror included in the optical module. The mirror tilt operation has already been described with reference to FIGS. 8C and 8D. The electronic device 100 may obtain 2D data regarding information about a distance to the object merely with rotation of the mirror without tilt of the mirror, and may obtain 3D information regarding the information about the distance to the object by rotating the mirror with tilt of the mirror.

According to an embodiment, the electronic device 100 may automatically or manually adjust the electronic device control factor. In the automatic adjustment, for example, when the electronic device 100 needs to adjust the electronic device control factor to detect a gesture for a particular application, the electronic device 100 may automatically adjust the electronic device control factor. For example, when the gesture to be detected by the electronic device 100 corresponds to the user's finger in the virtual keyboard, the electronic device 100 needs to detect both hands of the user and thus may set the rotation range of the mirror to scan the user's both hands.

In operation 1920, the electronic device 100 may radiate light in a state where the electronic device control factor is adjusted, and detect light reflected from the object, thus measuring a distance from the electronic device 100 to the object.

In operation 1930, the electronic device 100 may further adjust the electronic device control factor based on a result of detection of the light reflected from the object.

For example, the electronic device 100 may further adjust the electronic device control factor due to an environment change even though the electronic device 100 adjusts the electronic device control factor in operation 1910. The electronic device 100 may also adjust the electronic device control factor further precisely based on detected distance information after radiation of light to the object and detection of light reflected from the object.

For example, although the electronic device 100 initially sets the rotation range of the mirror to about 180 degrees based on a determination that the user makes a gesture using both hands, the electronic device 100 may not need to maintain a rotation range of about 180 degrees when the electronic device 100 determines that the user makes the gesture using one hand as a result of monitoring the user's gesture during a specific time. In this case, the electronic device 100 may adjust the rotation range of the mirror from about 180 degrees to about 60 degrees.

Both of adjustment of the electronic device control factor in operation 1910 and adjustment of the electronic device control factor in operation 1930 may be performed, or one of them may be selectively performed.

In operation 1940, the electronic device 100 may analyze an interaction point based on the light reflected from the object.

In operation 1950, the electronic device 100 may analyze the gesture based on the interaction point. The electronic device 100 may not directly perform a gesture analysis and deliver information about an interaction point to an external device which then performs the gesture analysis.

In operation 1960, the electronic device 100 may transmit a gesture analysis result to an external device.

According to an embodiment, the electronic device 100 may adjust the electronic device control factor according to a mode for reducing current consumption. For example, when a battery of a power source of the electronic device 100 is consumed much, the intensity of light or the rotation speed may be reduced in spite of a slight decrease in accuracy. A power-saving mode for saving current consumption may be executed automatically or manually.

According to an embodiment, when the electronic device 100 determines that the electronic device 100 is dropped due to collision, the electronic device 100 may abruptly stop rotation of the mirror to protect components of the electronic device 100.

Figure 20:
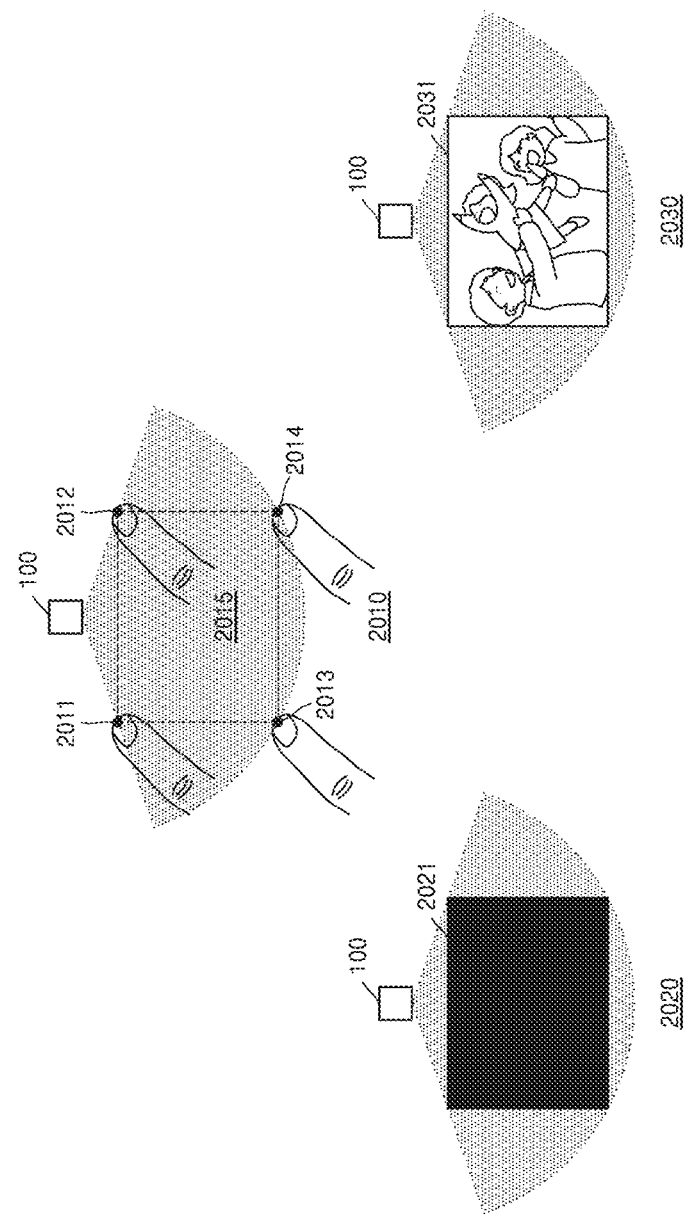
FIG. 20 is a reference diagram for describing various methods of determining a scan range of an electronic device 100 by using a mirror.

The scan range of the electronic device 100 using the mirror may be determined variously. FIG. 20 is a reference diagram for describing various methods of determining a scan range of an electronic device 100 by using a mirror.

According to an embodiment, the scan range of the mirror of the electronic device 100 may be determined by a user's finger touch.

Referring to 2010 of FIG. 20, once the electronic device 100 sets a scan range to the maximum and starts operating, the user may touch a user-desired scan range with a user's finger. The electronic device 100 may detect positions 2011, 2012, 2013, and 2014 touched by the user's finger and determine the scan range of the mirror such that a region 2015 defined by these positions falls within the scan range.

According to an embodiment, the scan range of the mirror of the electronic device 100 may be determined based on a size of an object.

Referring to 2020 of FIG. 20, when the user places the object such as paper, etc., in front of the electronic device 100, the electronic device 100 may detect a size of the object and determine the scan range of the mirror such that a region of the object 2021 falls within the scan range.

According to an embodiment, the scan range of the mirror of the electronic device 100 may be determined based on a size of a screen projected by the electronic device 100 or another external device.

Referring to 2030 of FIG. 20, a screen projected from a projection device is in front of the electronic device 100. The electronic device 100 may detect a size of a projected screen 2031 and determine the scan range of the mirror such that the projected screen 2031 falls within the scan range. The projected screen 2031 may be a screen projected from an external projection device other than the electronic device 100. The projected screen 2031 may be a screen projected by a projection module that may be further included in the electronic device 100.

The scan range of the electronic device 100 using the mirror may be changed adaptively.

Figure 21:
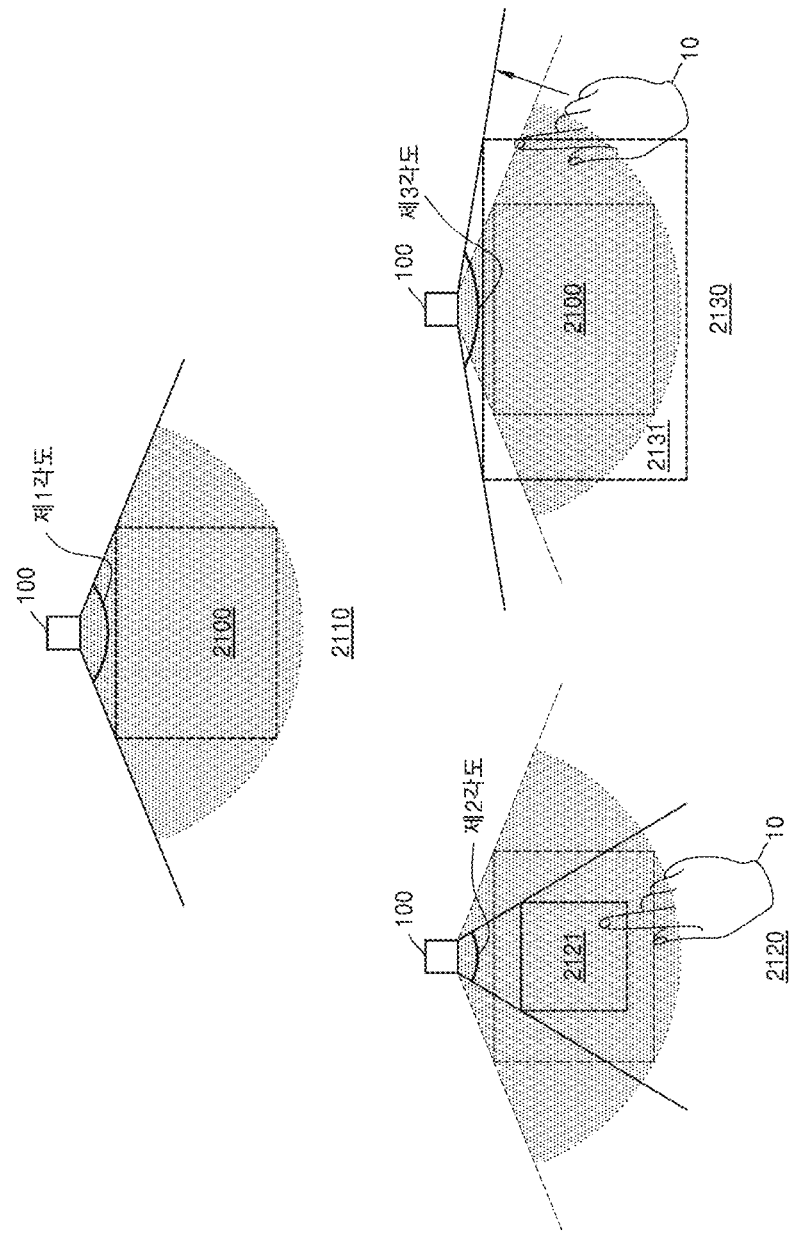
FIG. 21 is a reference diagram for describing a method of adaptively changing a scan range of an electronic device 100 by using a mirror.

FIG. 21 is a reference diagram for describing a method of adaptively changing the scan range of the electronic device 100 by using a mirror.

Referring to 2110 of FIG. 21, the electronic device 100 may set a scan range for scanning an object region 2100 to a first angle.

When the electronic device 100 operates within the scan range of the first angle like in 2110 and then the object region 2100 is size-reduced to an object region 2121, then the electronic device 100 may adaptively change the scan range. Referring to 2120 of FIG. 21, the electronic device 100 may set a scan range to a second angle. Size-reduction of the object region may be detected automatically by the electronic device 100 or may be detected by user's manual change to a small object.

When the electronic device 100 operates within the scan range of the first angle like in 2110 and then the object region 2100 is size-increased to an object region 2131, then the electronic device 100 may adaptively change the scan range. Referring to 2130 of FIG. 21, the electronic device 100 may set a scan range to a third angle. Size-increase of the object region may be detected by user's manual arrangement of a larger-size object, or when the user makes a motion beyond a range of the object region 2100, the electronic device 100 may recognize a need to increase the scan rage for accurate detection of a gesture of the user and adjust the scan range.

In the object region or the mirror's scan range, a plurality of users may make gestures and the electronic device 100 may detect the gestures of the plurality of users. For example, the electronic device 100 according to the current embodiment may be installed on one large table and the plurality of users may make a motion as if executing virtual keyboards, respectively. In this case, the scan range of the electronic device 100 may be adjusted based on at least one of angles or distances between touch points, the number of touch points, or positions of the touch points.

According to an embodiment of the present disclosure, the electronic device 100 may adjust the scan range by changing the brightness of the light source. By increasing the brightness of the light source, the light may be output more distantly, thereby expanding the scan range to a more distant place. In contrast, by reducing the brightness of the light source, the light may be output closer, thereby reducing the scan range.

The electronic device 100 may not correctly detect an object in the scan range due to a shadow caused by another object. In this case, a problem caused by a shadow region may be solved using two or more electronic devices.

Figure 22:
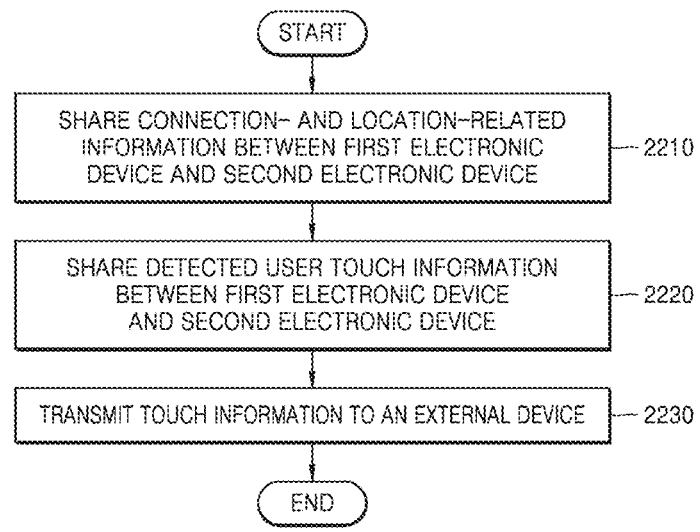
FIG. 22 is a flowchart illustrating a method of solving a shadow region by using two or more electronic devices, according to an embodiment.

FIG. 22 is a flowchart illustrating a method of solving a shadow region by using two or more electronic devices according to an embodiment.

Referring to FIG. 22, in operation 2210, a first electronic device and a second electronic device may share connection- and location-related information with each other.

The first electronic device and the second electronic device may perform connection using respective communication modules and share their location information with each other. With the location information, the first electronic device and the second electronic device may determine their locations by using at least one of a WiFi signal strength, a BT signal strength, or information obtained by a separate sensor capable of determining a location, for example, a global positioning system (GPS) sensor or a Zigbee sensor. In this way, sharing of the connection- and location-related information between the first electronic device and the second electronic device may be performed when the two devices are connected to each other, or periodically.

In operation 2220, the first electronic device and the second electronic device may share detected object distance information with each other.

Figure 23:
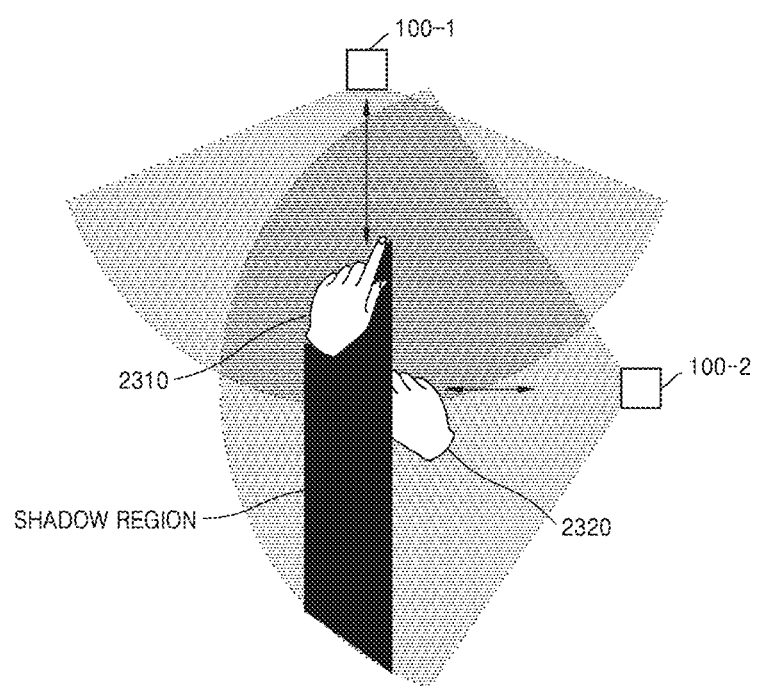
FIG. 23 is a reference diagram for describing a method of solving a shadow region by using two or more electronic devices, according to an embodiment.

For example, referring to FIG. 23, once a first electronic device 100-1 detects a first touch 2310 of the user, the first electronic device 100-1 may determine a position of a shadow region caused by the first touch 2310 and check a second electronic device 100-2 whether a second touch 2320 detected by the second electronic device 100-2 is in the determined position of the shadow region. When the detected second touch 2320 is in the position of the shadow region, the second electronic device 100-2 may deliver information about the second touch 2320 to the first electronic device 100-1.

Without a process in which the first electronic device 100-1 delivers the information about the shadow region to the second electronic device 100-2 and checks whether the second touch is in the shadow region, the second electronic device 100-2 may deliver information about the second touch 2320 detected by the second electronic device 100-2 directly to the first electronic device 100-1.

In operation 2230, at least one of the first electronic device and the second electronic device may perform a gesture analysis by referring to the shared object distance information or may deliver the object distance information to an external device.

For example, the first electronic device 100-1 may receive the information about the second touch 2320 received from the second electronic device 100-2 and directly perform a gesture analysis, or may transmit the information about the second touch 2320 received from the second electronic device 100-2 to the external device.

Meanwhile, as illustrated in FIG. 23, when a plurality of electronic devices are used for detection of a gesture or a touch, interference may occur between light emission and light reception. To prevent the interference, a signal of light radiated by each of the first electronic device and the second electronic device may be identified by varying at least one of a wavelength, a time, and a frequency of light of each electronic device. To distinguish between light from two or more electronic devices, a code may be added to each light. As an example of the code, a checksum may be separately added for distinguishment.

According to an embodiment, a gesture type may be mapped to each touch position of the user or each zone in the scan range of the electronic device 100 and a different control operation may be performed depending on the gesture type.

Figure 24:
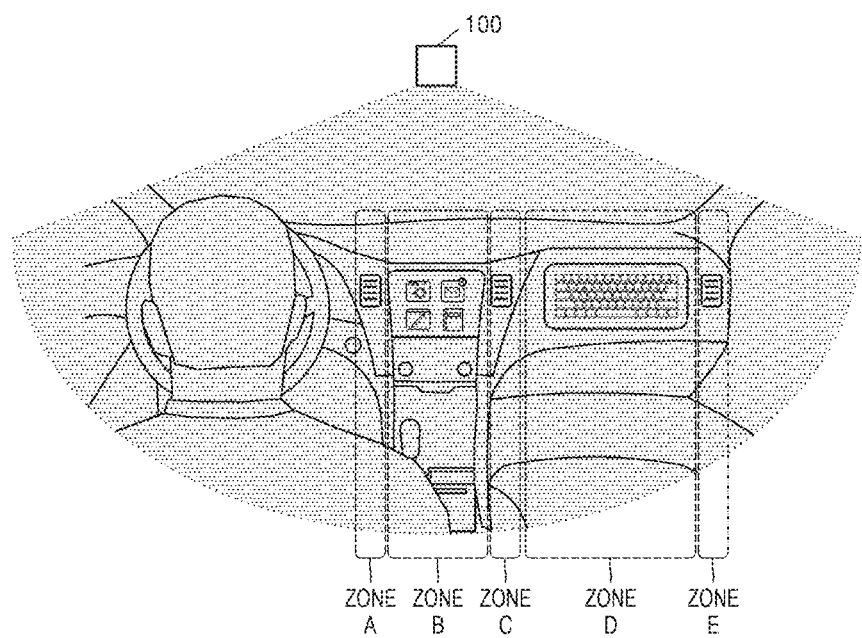
FIG. 24 is a reference diagram for describing that a gesture type is mapped to each touch position of a user or each zone in a scan range of an electronic device 100 and a different control operation is performed depending on the gesture type.

FIG. 24 is a reference diagram for describing that a gesture type is mapped to each touch position of a user or each zone in a scan range of the electronic device 100 and a different control operation is performed depending on the gesture type.

Referring to FIG. 24, the electronic device 100 is installed in a front portion of a vehicle. The electronic device 100 may scan a driving seat and a passenger seat. In this case, the electronic device 100 may divide the scan range for zones, apply different gesture interpretation to each zone, and transmit a signal used for controlling an internal device of the vehicle to the vehicle according to an interpreted gesture type.

For example, in the scan range, a zone A is mapped to a hovering gesture, such that an indoor temperature of the vehicle is adjusted by a moving-up/down gesture in a touch state and a direction of wind is adjusted by a moving-up/down gesture in a hovering state. In this case, the electronic device 100 may add a tilt operation to the mirror of the electronic device 100 to recognize the hovering gesture.

In the scan range, a zone B may be set to a zone where the user executes an icon, etc., by touching the icon, such that the electronic device 100 may operate in a mode of a general electronic device.

In the scan range, a zone C and a zone E may be mapped like the zone A.

In the scan range, a zone D may be set to a zone where the user has to make an input fast and accurately, e.g., the user executes virtual keyboard input. When a motion is mainly detected in the zone D, the electronic device 100 may scan a narrower range, adjust the intensity of light, or adjust the rotation speed of the mirror, thereby detecting a gesture or a touch in the zone D.

According to an embodiment, the electronic device 100 may operate in two or more modes.

Figure 25:
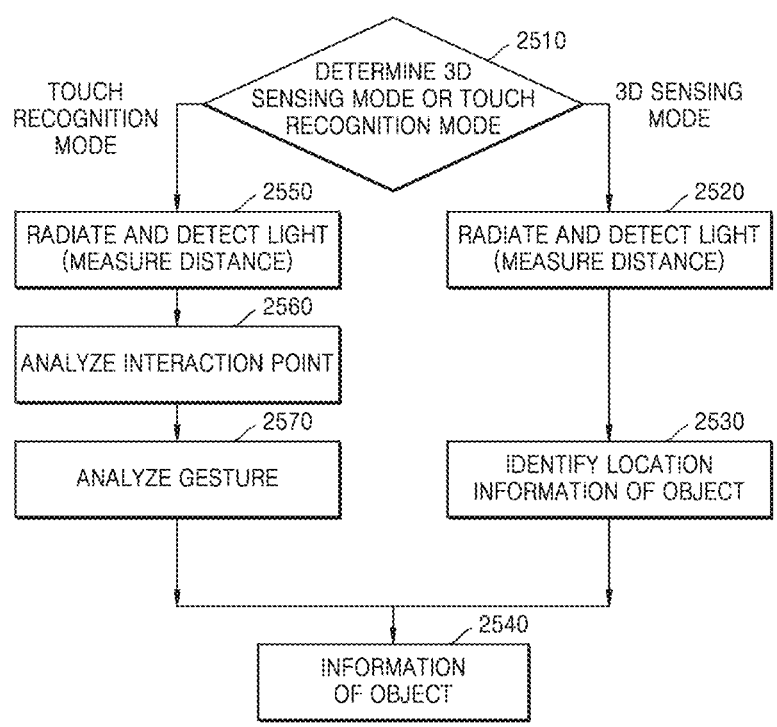
FIG. 25 is a flowchart illustrating a process of a method by which an electronic device 100 operates in a 3D sensing mode and a touch recognition mode.

FIG. 25 is a flowchart illustrating a process of a method in which the electronic device 100 operates in a 3D sensing mode and a touch recognition mode.

Referring to FIG. 25, in operation 2510, the electronic device may determine whether a current mode is a 3D sensing mode or a touch recognition mode.

The touch recognition mode refers to a mode where a motion of an object is detected to recognize a gesture or a touch as described above herein, and the 3D sensing mode refers to a mode where a location of an external object is determined and location information is delivered to an external device.

According to an embodiment, the 3D sensing mode or the touch recognition mode of the electronic device 100 may be manually set by the user.

According to an embodiment, the electronic device 100 may receive from a connected external device, information about whether the electronic device 100 is in the 3D sensing mode or the touch recognition mode.

According to an embodiment, the electronic device 100 may automatically determine based on information detected by the detection module included in the electronic device 100 whether the electronic device 100 is in the 3D sensing mode or the touch recognition node. For example, when the electronic device 100 is placed on a surface, the electronic device 100 may determine by using a sensor, etc., that the current mode is the touch recognition mode; when the electronic device 100 is detected as being in the air rather than on the surface, the electronic device 100 may determine that the current mode is the 3D sensing mode. According to an embodiment of the present disclosure, the sensor may include at least one of an acceleration sensor, a gyro sensor, a gravity sensor, an altitude sensor, an ultrasonic sensor, and a distance sensor.

In operation 2520, when the electronic device 100 determines that the electronic device 100 operates in the 3D sensing mode, the electronic device 100 may radiate light and detect light reflected from an object, thereby obtaining distance information.

In operation 2530, the electronic device 100 may identify location information of the object from the obtained distance information.

In operation 2540, the electronic device 100 may transmit the location information of the object to an external device.

When the electronic device 100 determines in operation 2510 that the electronic device 100 operates in the 3D sensing mode, the electronic device 100 may radiate light and detect light reflected from the object, thereby measuring a distance in operation 2450.

In operation 2560, the electronic device 100 may analyze an interaction point based on the measured distance information.

In operation 2570, the electronic device 100 may perform a gesture analysis based on an interaction point analysis.

In operation 2540, the electronic device 100 may transmit a gesture analysis result to an external device.

The electronic device according to the above-described embodiments may be used together with a large-volume screen. With popularization of a touch screen, touching a screen has become a user's natural desire. However, a capacitive or resistive touch panel, due to low speed thereof, is difficult to apply to a large-scale screen. However, by simply arranging the electronic device according to the current embodiments on a large-scale screen, the electronic device may provide a fast interaction experience on the large screen, thereby naturally satisfying a user's desire.

In addition, due to recent development of a small-size drone, a small-size lidar needs to be developed, but the current lidar, due to a large size and a heavy weight thereof, is not applicable to the small-size drone. The electronic device according to the current embodiments may be used for an autonomous drone, a means of transportation, a head-up display (HUD) in the means of transportation.

Recently, with the common use of a virtual reality (VR) device, an augmented reality (AR) device, or a mixed reality (MR) device, a device capable of controlling the VR device, the AR device, or the MR device has been required. The electronic device according to the current embodiments may be used for a small-size VR device, AR device, or MR device controller.

A term "module" used in various embodiments may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

According to various embodiments, at least some of devices (for example, modules or functions thereof) or methods (for example, operations) may be implemented with instructions stored in a computer-readable storage medium in a programming module type. When the instructions are executed by one or more processors (for example, the processor 110), the one or more processors may perform functions corresponding to the instructions. The computer-readable storage medium may be, for example, a memory included in the memory 190. At least some of the programming modules may be implemented (for example, executed) by, for example, the processor 110. At least some of the programming modules may include, for example, modules, programs, routines, sets of instructions, or processes for performing one or more functions.

The computer readable recording medium includes magnetic media such as hard disk, floppy disk, or magnetic tape, optical media such as compact disc read only memory (CD-ROM) or digital versatile disc (DVD), magneto-optical media such as floptical disk, and a hardware device, such as ROM, RAM, flash memory, specially configured to store and execute a program instruction (e.g., a programming module). Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

According to various embodiments, in a storage medium storing instructions that, when executed by at least one processor, cause the at least one processor to at least one operation, the at least one operation may include radiating light to an object, detecting a distance to the object from the electronic device by using light reflected from the object, and determining touch information and/or gesture information of the object based on information about the detected distance to the object. The embodiments disclosed in the present specification and drawings have been provided to easily describe the present disclosure and to help understanding of the present disclosure, and are not intended to limit the scope of the present disclosure. Therefore, it should be construed that the scope of various embodiments of the present disclosure includes any change or other various embodiments based on the technical spirit of the present disclosure as well as the embodiments described herein.

What is claimed is:

1. An electronic device comprising:
    an optical module configured to radiate light to an object and detect a distance between the object and the electronic device by using light reflected from the object, the optical module comprising one or more light sources, a light path change element configured to change a path of light from the one or more light sources and to deliver the light to the object, a distance detection sensor configured to receive light reflected from the object and to detect the distance based on the reflected light, and a rotation element configured to rotate the light path change element; and
    a processor configured to:
    control the optical module to detect the distance, and
    determine touch information and/or gesture information of the object based on the detected distance,
    receive, via a communication interface, a signal indicating that an application is executed in an external device, from the external device, and
    adjust a control factor for controlling the optical module based on a type of the application being executed in the external device, the control factor comprising at least one of a strength of the one or more light sources, and a rotation speed of the rotation element, the application being a computer program which is executed in the external device connected through the communication interface, to perform a function, a task, or an activity for helping a user's motion,
    wherein the processor is further configured to adjust a strength of the one or more light sources or the rotation speed of the rotation element differently according to the type of the application.

2. The electronic device of claim 1, wherein the processor is further configured to determine one or more interaction points based on the detected distance.

3. The electronic device of claim 2, wherein the processor is further configured to determine the one or more interaction points based on an interaction group determined based on the detected distance, an interaction type of the determined interaction group, or an interaction type determined based on the detected distance.

4. The electronic device of claim 3, wherein the processor is further configured to determine a main interaction point associated with the one or more interaction points based on at least one of a direction in and a speed at which the one or more interaction points move.

5. The electronic device of claim 1, wherein the processor is further configured to obtain environment information from at least one of a user input, an image-obtaining sensor, a surrounding environment detection sensor, and information detected by the optical module.

6. The electronic device of claim 1, wherein the rotation element comprises at least one of a rotation support configured to rotate the light path change element in a transverse direction or a tilt support configured to rotate the light path change element in a direction that is different from the transverse direction.

7. The electronic device of claim 1, wherein the one or more light sources are integrated in one piece with the distance detection sensor or the light path change element.

8. An operation method of an electronic device, the operation method comprising:
    radiating light to an object and detecting a distance between the object and the electronic device by using light reflected from the object, via an optical module of the electronic device;
    determining touch information and/or gesture information of the object based on the detected distance;
    receiving, via a communication interface, a signal indicating that an application is executed in an external device, from the external device; and
    adjusting a control factor for controlling the optical module based on a type of the application being executed in the external device, the control factor comprising at least one of a strength of one or more light sources, and a rotation speed of a rotation element, the application being a computer program which is executed in the external device connected through the communication interface, to perform a function, a task, or an activity for helping a user's motion,
    wherein the operation method further comprises adjusting a strength of one or more light sources or the rotation speed of the rotation element differently according to the type of the application.

9. The operation method of claim 8, further comprising determining one or more interaction points based on the detected distance.

10. The operation method of claim 9, further comprising determining the one or more interaction points based on an interaction group determined based on the detected distance, an interaction type of the determined interaction group, or an interaction type determined based on the detected distance.

11. The operation method of claim 10, further comprising determining a main interaction point associated with the one or more interaction points based on at least one of a direction in and a speed at which the one or more interaction points move.

12. The operation method of claim 8, further comprising obtaining environment information from at least one of a user input, an image-obtaining sensor, a surrounding environment detection sensor, and information detected by the optical module.

13. The operation method of claim 8, wherein the electronic device comprises an optical module, and
    wherein the optical module comprises one or more light sources configured to radiate light, a distance detection sensor configured to receive light reflected from the object and detect the distance between the object and the electronic device, and an element configured to change a path of transmitted and received light, and the one or more light sources are integrated in one piece with the distance detection sensor or the element.

14. The operation method of claim 13, wherein the element rotates in a transverse direction and/or in a direction that is different from the transverse direction.

15. A non-transitory computer-readable recording medium storing a program that executes an operation method of an electronic device, the operation method comprising:
  radiating light to an object and detecting a distance between the object and the electronic device by using light reflected from the object, via an optical module of the electronic device;
  determining touch information and/or gesture information of the object based on the detected distance;
  receiving, via a communication interface, a signal indicating that an application is executed in an external device, from the external device; and
  adjusting a control factor for controlling the optical module based on a type of the application being executed in the external electronic device, the control factor comprising at least one of a strength of the one or more light sources, and a rotation speed of the rotation element the application being a computer program which is executed in the external device connected through the communication interface, to perform a function, a task, or an activity for helping a user's motion,
  wherein the operation method further comprises adjusting a strength of the one or more light sources or the rotation speed of the rotation element differently according to the type of the application.

16. The electronic device of claim 1, wherein the processor is further configured to stop rotation of the rotation element when the electronic device is determined to be dropped.

17. The operation method of claim 8, wherein the optical module comprises one or more light sources, a light path change element configured to change a path of light from the one or more light sources and to deliver the light to the object, a distance detection sensor configured to receive light reflected from the object and to detect the distance to the object from the electronic device based on the reflected light, and a rotation element configured to rotate the light path change element, and
  the operation method further comprising:
    stopping rotation of the rotation element when the electronic device is determined to be dropped.

18. The electronic device of claim 1, wherein based on the type of the application being a virtual keyboard, the processor is further configured to increase the strength of the one or more light sources or the rotation speed of the rotation element to detect a motion of an object associated with the virtual keyboard.

* * * * *